(12) United States Patent
Dickey et al.

(10) Patent No.: US 12,219,599 B2
(45) Date of Patent: Feb. 4, 2025

(54) CONCURRENT LISTENING

(71) Applicant: Silicon Laboratories Inc., Austin, TX (US)

(72) Inventors: Terry L. Dickey, Pflugerville, TX (US);
Yan Zhou, Spicewood, TX (US);
Wentao Li, Austin, TX (US);
Rangakrishnan Srinivasan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 374 days.

(21) Appl. No.: 17/743,042

(22) Filed: May 12, 2022

(65) Prior Publication Data

US 2023/0371067 A1    Nov. 16, 2023

(51) Int. Cl.
| | | |
|---|---|---|
| H04L 12/66 | (2006.01) | |
| H04L 5/00 | (2006.01) | |
| H04M 3/00 | (2024.01) | |
| H04M 5/00 | (2006.01) | |
| H04W 4/23 | (2018.01) | |
| H04W 4/80 | (2018.01) | |
| H04W 74/04 | (2009.01) | |
| H04W 74/0808 | (2024.01) | |

(52) U.S. Cl.
CPC ....... *H04W 74/0808* (2013.01); *H04L 5/0053* (2013.01); *H04W 4/23* (2018.02); *H04W 4/80* (2018.02); *H04W 74/04* (2013.01)

(58) Field of Classification Search
CPC ......... H04L 67/12; H04L 69/18; H04L 41/12; H04L 27/14; H04L 27/2636; H04L 1/0025; H04L 5/001; H04L 67/141; H04W 4/80; H04W 8/005; H04W 4/023; H04W 84/12; H04W 16/14; H04W 4/02; H04W 56/001; H04W 4/30; H04W 72/0453; H04W 76/15; H04W 84/20; G06Q 20/308

See application file for complete search history.

(56) References Cited

U.S. PATENT DOCUMENTS

| | | |
|---|---|---|
| 8,331,518 B2 | 12/2012 | Sawai et al. |
| 8,681,598 B2 | 3/2014 | Maltsev et al. |
| 9,980,277 B2 | 5/2018 | Dickey et al. |
| 10,278,200 B2 | 4/2019 | Dickey et al. |

(Continued)

OTHER PUBLICATIONS

Peled, Ohad, "Solving the Challenge of Many Devices with Multiple Standards in the Connected Home," White Paper, Jan. 2021, downloaded from www.qorvo.com on Aug. 10, 2021, 6 pages.

*Primary Examiner* — Kharye Pope
(74) *Attorney, Agent, or Firm* — Zagorin Cave LLP

(57) ABSTRACT

A wireless communication device has a receiver to listen to a sequence of channels. A controller responds to a preamble being detected on a first channel while the receiver is tuned to the first channel by causing the receiver to stay on the first channel and decode packet(s) associated with the preamble. The controller responds to detection of a first symbol of a first transmission protocol and the preamble not being detected to cause the receiver to stay on the first channel for a predetermined time waiting for a retry. The controller responds to detection of a second symbol of a second transmission protocol and the preamble not being detected to cause the receiver to switch to an advertising channel of the second transmission protocol. If no preambles, noise, or symbols are detected, the receiver switches to listening to a next channel in the sequence after a fixed time.

21 Claims, 21 Drawing Sheets

(56) References Cited

U.S. PATENT DOCUMENTS

| | | |
|---|---|---|
| 10,333,750 B2 | 6/2019 | de Ruijter |
| 10,342,028 B2 | 7/2019 | Dickey et al. |
| 10,667,285 B2 | 5/2020 | Dickey et al. |
| 10,812,302 B2 | 10/2020 | de Ruijter |
| 2015/0288532 A1 | 10/2015 | Veyseh et al. |
| 2017/0250737 A1 | 8/2017 | Riviere et al. |
| 2018/0324829 A1 | 11/2018 | Van Driest et al. |
| 2020/0195544 A1 | 6/2020 | Zhou et al. |

Detection Timetable

| Detectors | Multi-PHY Parallel Processing | PHYs | Symbols | Detection Time(μs) |
|---|---|---|---|---|
| Noise Detector(ND) | Yes | NA | NA | 4~16 |
| Preamble Symbol Identifier(PSI) | Yes | Zigbee | 1 | 16 |
| | | BLE2 | 12 | 9 |
| | | BLELR | 4 | 35 |
| | | BLE1 | 12 | 15 |
| Correlator Bank Stage 1(CBS_1) Cross Correlation Length Extension Technique1 | Yes | Zigbee | 3 | 48 |
| | | BLE2 | 32 | 16 |
| | | BLELR | 12 | 96 |
| | | BLE1 | 32 | 32 |
| Correlator Bank Stage 2(CBS_2) Cross Correlation Length Extension Technique2 | No | Zigbee | 8 | 128 |
| | | BLE2 | 32 | 16 |
| | | BLELR | 32 | 256 |
| | | BLE1 | 32 | 32 |
| Arbitrary Symbol Identifier(ASI) For Payload | Yes | Zigbee | 1 | 39 |
| | | BLE2 | 16 | 17 |
| | | BLE1/BLELR | 16 | 22 |

FIG. 14

CONCURRENT LISTENING

CROSS-REFERENCE TO RELATED APPLICATION(S)

This application relates to the application entitled "Context Switching Demodulator and Symbol Identifier", filed the same day as the present application, naming Wentao Li et. al., as inventors, application Ser. No. 17/743,042, filed May 12, 2022, which application is incorporated herein by reference.

BACKGROUND

Field of the Invention

This application relates to wireless communication devices and more particularly to wireless communication devices capable of efficiently listening for transmissions sent with different transmission protocols.

Description of the Related Art

Internet of Things (IoT) wireless communication device-based products often need to operate at the same time on multiple wireless protocols such as IEEE 802.15.4 based protocols (Zigbee™ and OpenThread) and Bluetooth® Low Energy/Bluetooth (BLE/BT) Mesh. Prior solutions have been to integrate two or more wireless communication devices or use Dynamic Multi-Protocol (DMP), which is software that switches between multiple protocols by using time multiplexing. Use of multiple wireless communication devices increases product size and cost (multiple or larger integrated circuits, more antennas, increased external bill of materials (BOM), etc.)) and DMP cannot adequately support more than one protocol that requires near 100% receive (RX) listening. Current DMP solutions can only handle the BLE Connection interval case with the rest of the time spent on 802.15.4 unknown RX arrival listening. With only one demodulator being used, to switch to another wireless protocol, firmware stops current demodulator operations, then computes new settings and restarts the demodulator in the new protocol. Relative to the duration of preambles in BLE (8 μs) and IEEE 802.15.4 (128 μs) a context switch, i.e., switching to receiving transmissions transmitted with a different wireless protocol, can take a long time and result in dropped communications. In addition, with only one wireless protocol being received, other wireless protocols are blocked until the receiver becomes free.

Accordingly, it would be desirable to be able to provide better capability to listen for transmissions sent with different wireless protocols to reduce the chances for dropped communications, reduce latency, and increase communication speeds.

SUMMARY OF EMBODIMENTS OF THE INVENTION

In one embodiment a method for listening to a plurality of channels includes configuring a receiver to listen to a first channel of the plurality of channels. The receiver stays on the first channel and decodes one or more packets associated with the preamble responsive to a preamble being detected on the first channel. If a first symbol is detected on the first channel, the receiver stays on the first channel for a predetermined amount of time responsive to the first symbol having been transmitted with a first transmission protocol and a first preamble associated with the first transmission protocol not being detected. The receiver switches to listening to an advertising channel responsive to a second symbol being detected and the second symbol was transmitted with a second transmission protocol and a second preamble associated with the second transmission protocol was not detected.

In another embodiment a wireless communication device includes a controller responsive to a preamble being detected on a first channel to cause a receiver of the wireless communication device to stay on the first channel and decode one or more packets associated with the preamble. Symbol identifiers detect respective symbols on the first channel. If a first symbol is detected, the controller is responsive to the first symbol having been transmitted with a first transmission protocol and a first preamble associated with the first transmission protocol not being detected to cause the receiver to stay on the first channel for a predetermined amount of time waiting for a retry packet. The controller causes the receiver to switch to listening to an advertising channel of a second transmission protocol if a second symbol is detected and the second symbol was transmitted with a second transmission protocol and a second preamble associated with the second transmission protocol was not detected.

In another embodiment, a wireless communication device includes a demodulator configured to demodulate data from a plurality of transmission protocols. One or more symbol identifier circuits are coupled to the demodulator. A controller is responsive to a preamble being detected by the demodulator on a first channel of a plurality of channels while a receiver of the wireless communication device is tuned to the first channel to cause the receiver to stay on the first channel and cause the receiver to decode one or more packets associated with the preamble. The controller is responsive to a first symbol of a first transmission protocol being detected by one of the one or more symbol identifier circuits and a first preamble of the first transmission protocol not being detected, to cause the receiver to stay on the first channel for a predetermined amount of time. The controller is responsive to a second symbol of a second transmission protocol being detected by one of the one or more symbol identifier circuits and a second preamble of the second transmission protocol not being detected, to cause the receiver to switch to listening to an advertising channel of the second transmission protocol.

BRIEF DESCRIPTION OF THE DRAWINGS

The present invention may be better understood, and its numerous objects, features, and advantages made apparent to those skilled in the art by referencing the accompanying drawings.

FIG. 14 is a table showing an exemplary detection timetable for various receiver components.

The use of the same reference symbols in different drawings indicates similar or identical items.

DETAILED DESCRIPTION

Embodiments described herein support IoT concurrent listening by providing a dynamic multi-protocol receiver that can handle multiple protocols concurrently as well as quickly switch between protocols. Embodiments described herein utilize multiple and simultaneous protocol detections at preamble, sync-word, or packet payload phases. To provide robust detection and achieve fewer false detections, the receiver extends the cross-correlation length once a short cross-correlation is determined to be valid.

Embodiments use a single demodulator configuration to concurrently detect IEEE 802.15.4, BLE1, BLE Long Range (BLELR) in accordance with Bluetooth Version 5.0, and BLE2 packets, where BLE1 and BLE2 refer to the bit rate (1 Mbps or 2 Mbps). As described further herein, the demodulator does not require reconfiguration when switching from BLE to Zigbee or from Zigbee to BLE. Note that for the purposes of the radio demodulator and system described herein the term Zigbee will be used for ease of reference to describe IEEE 802.15.4 based protocols including Zigbee and Thread.

As such, it allows near-instantaneous switching from BLE to Zigbee with little or no dropped communications. Thus, the communication between devices is faster, more efficient, and more scalable. The single demodulator approach with fast frequency switching provides a substantial improvement over DMP, but without the increased cost of multiple IoT radios.

While the demodulator described herein provides performance enhancement, another aspect that provides performance enhancement is utilization of a fast-switching synthesizer to provide local oscillator (LO) signals suitable for the selected receive channel. The use of a fast-switching frequency synthesizer for the local oscillator allows switching, e.g., to new BLE or Zigbee frequencies quickly. Such a fast-switching frequency synthesizer is described in the application entitled "Fast Frequency Synthesizer Switching", naming Rangakrishnan Srinivasan et al. as inventors, application Ser. No. 17/709,642, filed Mar. 31, 2022, which application is incorporated herein by reference. In an embodiment, the RF synthesizer can settle to an 802.15.4 RX channel or any BLE channel (including ADV channels and DATA channels that can be used as advertising channels with Wake-up radio applications) in, e.g., less than 10 μs. Note also that the switching speed between channels depends on how a particular embodiment is implemented and the switching speed requirements of a particular application.

Figure 1:
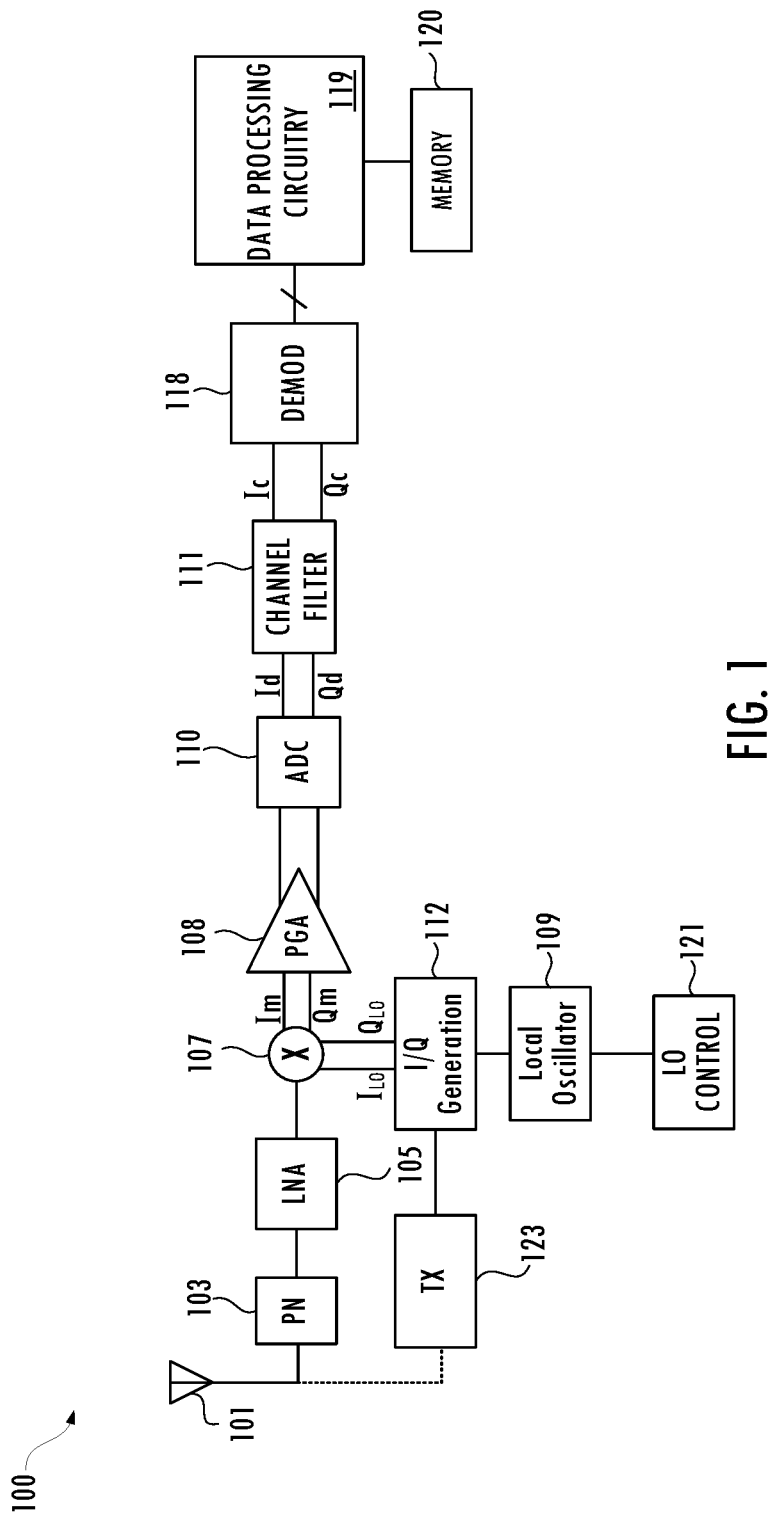
FIG. 1 is a high level block diagram of an embodiment of a wireless communication device included in a wireless communications device.

FIG. 1 illustrates a high-level block diagram of an embodiment of a receiver 100 included in a wireless communications device that includes a fast-switching frequency synthesizer and a fast context switching demodulator. Antenna 101 provides an RF signal to passive network (PN) 103 that provides impedance matching, filtering, and electrostatic discharge protection. Low-noise amplifier (LNA) 105 amplifies the signals from passive network 103 without substantial degradation to the signal-to-noise ratio and provides the amplified RF signals to mixer 107. Mixer 107 performs frequency translation or shifting of the RF signals, provided by the I/Q generation block 112, which is supplied from a local oscillator (LO) implemented in embodiments as a fast frequency synthesizer. The I/Q generation block 112 converts the local oscillator signal from local oscillator 109 to I and Q signals for the RX mixer 107 and the transmit (TX) mixer (not shown separately in TX block 123).

Mixer 107 provides the translated output signal as a set of two signals, an in-phase (Im) signal, and a quadrature (Qm) signal, to programmable gain amplifiers (PGA) 108. The Im and Qm signals are analog time-domain signals. In at least one embodiment of receiver 100, the analog amplifiers 108 and filters (not separately illustrated) provide amplified and filtered version of the Im and Qm signals to an analog-to-digital converter (ADC) 110, which converts those versions of the Im and Qm signals to digital Id and Qd signals. ADC 110 provides digital Id and Qd signals to channel filters 111, which provide digital filtering of the digital Id and Qd signals and provides the filtered Ic and Qc signals to a fast context switching demodulator 118 capable of concurrent demodulation of multiple physical layer (PHY) transmission modes including IEEE 802.15 based PHYs, Bluetooth, BLE, and BLELR transmission modes.

The demodulator 118 demodulates the digital Ic and Qc signals to retrieve or extract information, such as data signals, that were modulated (e.g., in a transmitter not shown), and provided to antenna 101 as RF signals. As explained further herein, the demodulator includes multiple paths for different PHYs for concurrent demodulation. The demodulator 118 provides the demodulated data to the data processing circuitry 119. In embodiments data processing circuitry 119 performs a variety of functions (e.g., logic, arithmetic, etc.). While shown separately, portions of the data processing circuitry 119 are also used for demodulation. Those portions may be dedicated to demodulation functions. Other portions of the data processing circuitry 119 uses the demodulated data in a program, routine, or algorithm (whether in software, firmware, hardware, or a combination) to perform desired control or data processing tasks. In an embodiment, the data processing circuitry includes one or more processors such as a microcontroller(s) and software and/or firmware to perform the desired functions. The memory 120 stores software and firmware for use by data processing circuitry 119 to perform various tasks and stores data supplied to or from data processing circuitry 119. The memory 120 may include multiple kinds of memory in various embodiments including dynamic random-access memory (DRAM), static random access memory (SRAM), and/or non-volatile memory (NVM), according to system needs. In addition, while the data processing circuitry can access memory 120, in embodiments, other system components, such as LO control block 121 can also access memory 120, or portions thereof. In embodiments, at least some functionality of LO control block 121 are implemented by software/firmware running on a processor in data processing circuitry 119. FIG. 1 also shows a transmit path 123 that utilizes the same antenna and local oscillator as the receive path. The transmit data may be sent from the memory 120. Details of the transmit path are well known in the art and not further described herein.

Figure 2:
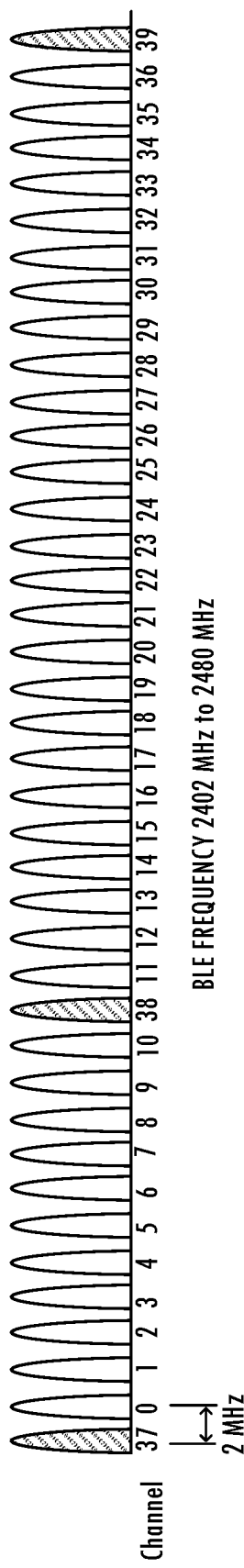
FIG. 2 shows the 40 RF channels in BLE.

As described further herein, embodiments of system 100 include preamble detection capability, arbitrary symbol identification capability, and noise detection capability to assist in concurrently listening to transmissions of multiple PHYs. Embodiments provide significant performance improvement in monitoring both 802.15.4 unknown RX arrival listening and BLE/BT Mesh unknown RX arrival on BLE advertising (ADV) channels in the 2.4 GHz frequency band. Embodiments described herein support background concurrent listening to IEEE 802.15.4 based protocols, e.g., Zigbee receive (RX) channels (2405 MHz to 2480 MHz spaced 5 MHz apart) and BLE advertising channels as shown in FIG. 2. FIG. 2 shows the 40 RF channels in BLE separated by 2 MHz center to center. The BLE channels include Primary Advertising Channels 37, 38, and 39 with center frequencies of 2402 MHz, 2426 MHz, and 2480 MHz respectively. The remaining 37 channels are called the Secondary Advertisement Channels and are used for data transfers during the Connection state. Secondary advertising channels are used as auxiliary channels meaning that a device has to first advertise on the primary advertising channels before sending out advertising packets on the secondary channels. In the Advertising state, a device sends out packets containing useful data for others to receive and process. The advertising packets are sent at an interval defined as the Advertising Interval. The Advertising interval has both a fixed interval and a random delay. The BLE connection interval is the time between two data transfer events between the central and the peripheral device.

Figure 3:
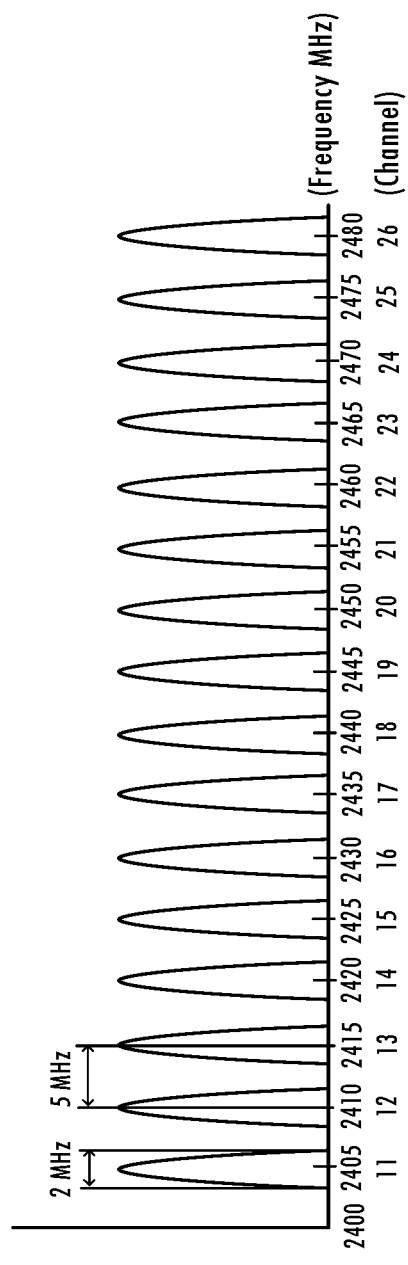
FIG. 3 shows the Zigbee channels 11 to 26.

FIG. 3 shows the Zigbee channels 11 to 26 (2405 MHz to 2480 MHz) with a width of 2 MHz separated by 5 MHz center to center. Note that the BLE advertising channel 39 (2480 MHz) and the Zigbee channel 26 (2480 MHz) are centered at the same frequency. Thus, simultaneous listening and demodulation is required for concurrent listening. Note that the Zigbee channels 15, 20, and 25 are popular channels because they fall in the gaps between popular WiFi channels. The popular Wi-Fi channels are channels 1, 6, and 11, each with 20 MHz bandwidth. Respective center frequencies are 2412 MHz, 2437 MHz, and 2462 MHz.

A typical implementation of a single radio implementing DMP cannot receive two packets for two different protocols simultaneously and switching between protocols requires a time consuming process of reconfiguring the demodulator for the new protocol. In contrast, the demodulator described herein can run several radio protocols simultaneously without the time-consuming process of demodulator reconfiguration. Switching between protocols requires only a synthesizer frequency change of the radio peripheral, since protocols may operate on different frequencies. Thus, embodiments described herein simultaneously monitor four PHYs (IEEE 802.15.4, BLE1, BLE2, BLELR). That allows near-instantaneous switching from BLE to Zigbee or Thread with little or no dropped communications. While monitoring one protocol, the demodulator can simultaneously monitor the other protocol. For an example, after BLE is in the connection state, if another transmitter is transmitting IEEE 802.15.4 on the same channel, the demodulator is able to detect IEEE 802.15.4 traffic.

Figure 4:
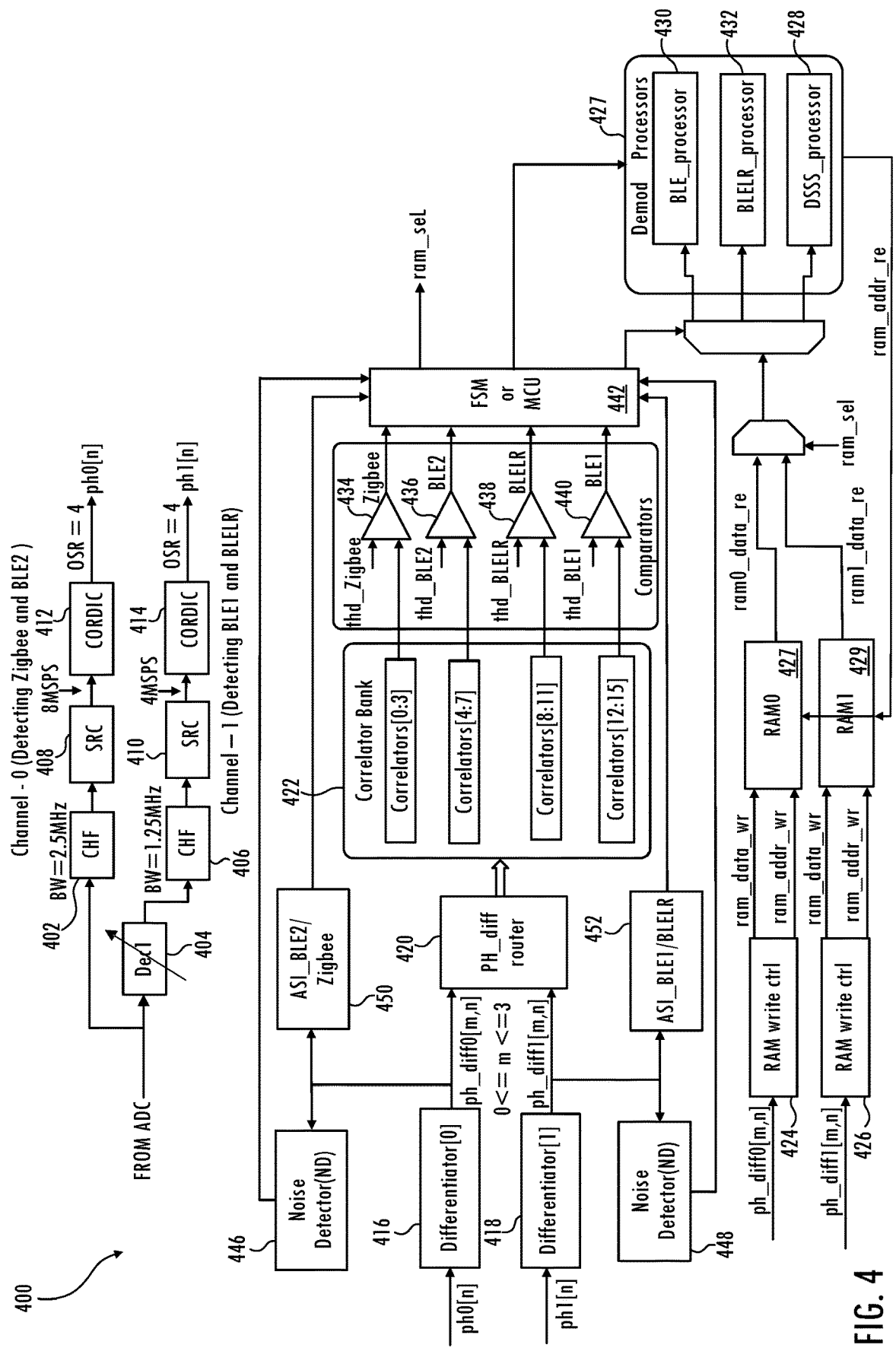
FIG. 4 illustrates an embodiment of a portion of an RF receiver that can simultaneously monitor multiple protocols.

FIG. 4 illustrates an embodiment of a portion 400 of an RF receiver that can simultaneously monitor multiple protocols. The embodiment includes dual RAMs RAM0 427 and RAM1 429. The portion 400 includes portions of the receiver 100 including channel filters 111, demodulator 118, data processing circuitry 119, and memory 120. The portion 400 includes two demodulator paths shown as Channel-0 and Channel-1. The paths are coupled to receive data from the ADC (see ADC 110 in FIG. 1). The Channel-0 path includes a channel filter 402 having a bandwidth of 2.5 MHz and the Channel-1 path includes a decimator 404 that reduces the data by two and a channel filter 406 having a bandwidth of 1.25 MHZ, which is half the bandwidth of the Channel-0 filter. The two paths include sample rate converters (SRC) 408 and 410 supplying I and Q samples at 8 mega samples per second (MSPS) and 4 MSPS, respectively, to Coordinate Rotation Digital Computer (CORDIC) 412 and 414. In general, a CORDIC implements known techniques to perform calculations, including trigonometric functions and complex multiplies, without using a multiplier. The operations the CORDIC uses are addition, subtraction, bit-shift, and table-lookup operations. In other embodiments, a digital signal processor executing firmware is used. CORDICs 412 and 414 convert digital I and Q signals from a Cartesian representation into polar representation by performing an arctangent operation. The polar representation includes a phase and magnitude. The phase information from Channel-0 is oversampled with an oversampling rate (OSR) equal to 4 and the ph0[n] samples are supplied to the differentiator 416. Similarly, Channel-1 is oversampled with an OSR=4, and the ph1[n] data is supplied to differentiator 418. The differentiators provide frequency information, which is routed through the phase difference (PH_diff) router 420 to the correlator bank 422. Channel-0 is used for detecting Zigbee and BLE2 and Channel-1 is used for detecting BLE1 and BLELR.

The differentiator 416 provides Channel-0 data as:

ph_diff0[m,n]=ph0[4*n+m]−ph0[4*n+m−4], and the differentiator 418 provides Channel-1 data as:

ph_diff1[m,n]=ph1[4*n+m]−ph1[4*n+m−4], where m varies inclusively between 0 and 3 cyclically, n is the sample number, and the bit width of ph0, ph_diff0, ph1 and ph_diff1 are same. For example, the table below illustrates calculating ph_diff( ) for three samples (n=0,1,2):

| n | m | ph_diff0[m, n] |
|---|---|---|
| 0 | 0 | ph_diff0[0, 0] = ph0[0] − ph0[−4] |
| 0 | 1 | ph_diff0[1, 0] = ph0[1] − ph0[−3] |
| 0 | 2 | ph_diff0[2, 0] = ph0[2] − ph0[−2] |
| 0 | 3 | ph_diff0[3, 0] = ph0[3] − ph0[−1] |
| 1 | 0 | ph_diff0[0, 1] = ph0[4] − ph0[0] |
| 1 | 1 | ph_diff0[1, 1] = ph0[5] − ph0[1] |
| 1 | 2 | ph_diff0[2, 1] = ph0[6] − ph0[2] |
| 1 | 3 | ph_diff0[3, 1] = ph0[7] − ph0[3] |
| 2 | 0 | ph_diff0[0, 2] = ph0[8] − ph0[4] |
| 2 | 1 | ph_diff0[1, 2] = ph0[9] − ph0[5] |
| 2 | 2 | ph_diff0[2, 2] = ph0[10] − ph0[6] |
| 2 | 3 | ph_diff0[3, 2] = ph0[11] − ph0[7] |

The RAM write control block 424 also receives the ph_diff( ) data and saves ph_diff0[m,n] in the RAM0 427. The RAM write control block 426 receives ph_diff1 [m,n] data and saves ph_diff1[m,n] data in RAM1 429. After the PHY selection decision has made as to which kind of preamble has been received, if Zigbee or BLE2 data has been received, data in RAM0 is sent to one of the demodulator processors 427 and specifically to the direct-sequence spread spectrum (DSSS) processor 428. If the selected PHY is BLE1 or BLELR, the controller causes the data to be sent to the BLE processor 430 or to the BLELR processor 432 for demodulation.

Figure 5:
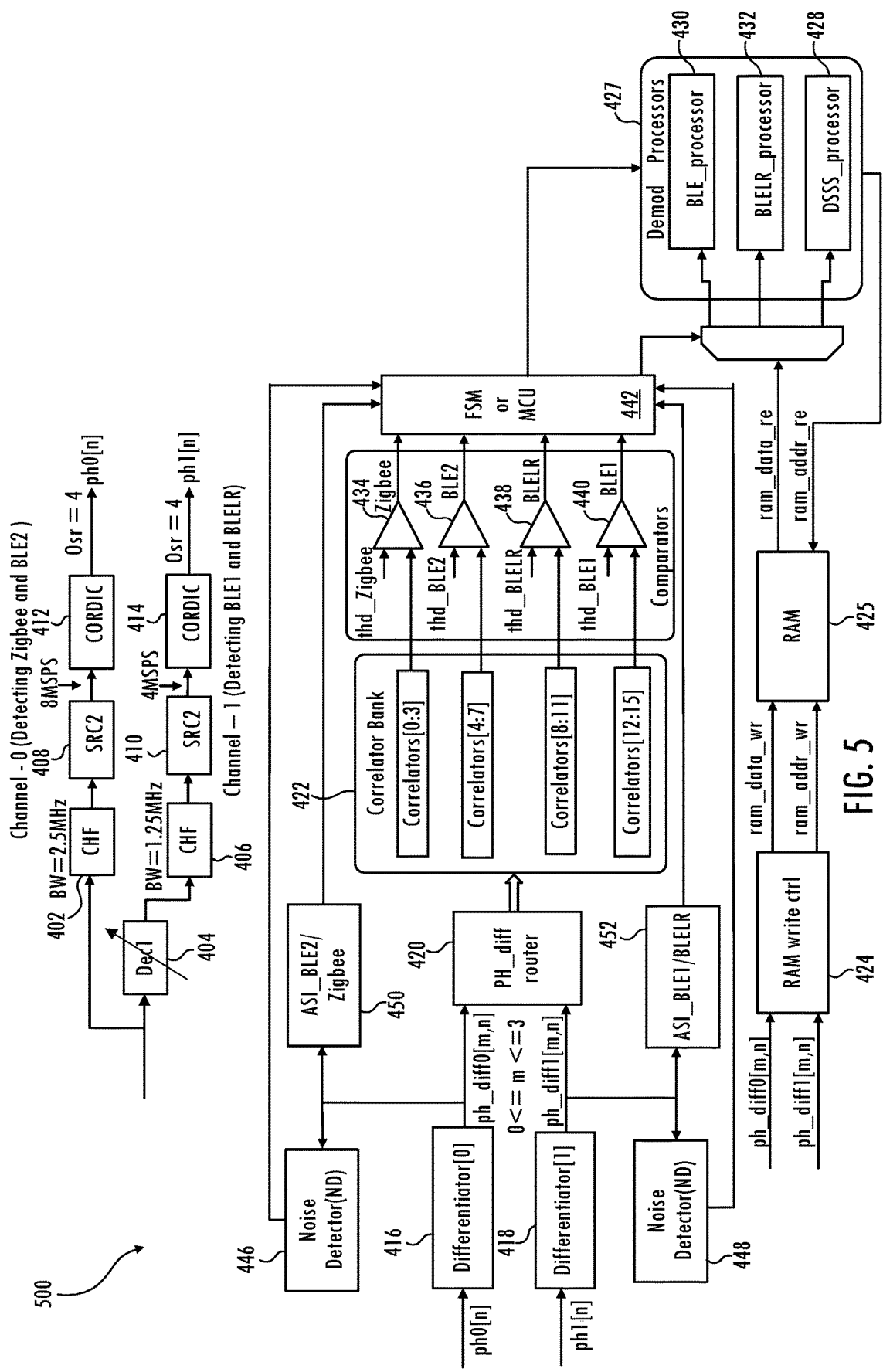
FIG. 5 illustrates an embodiment of a portion of an RF receiver that can simultaneously monitor multiple protocols and uses a single RAM for the two demodulation paths.

FIG. 5 shows an embodiment that uses a single RAM 425 instead of RAM0 and RAM1. Before the PHY is selected ph_diff0[m,n] is saved in the RAM 425 with even addresses and ph_diff1[m,n] is saved in the RAM with odd addresses. Note that m=mod(n,4). The "mod" is the modulo operation that returns the remainder of a division, after one number "n" is divided by another number, here "4". For even addresses, ram_data=ph_diff0[mod(n,4),n] and for odd addresses, ram_data=ph_diff1[mod(n,4),n]. After the PHY selection decision, if Zigbee or BLE2 is selected as the PHY, only ph_diff0[m,n] will be saved in the RAM as ram_data=ph_diff0[mod(n,4),n]. If BLE1 or BLELR is selected, only ph_diff1 [m,n] will be saved in the RAM as ram_data=ph_diff1[mod(n,4),n].

Figure 6:
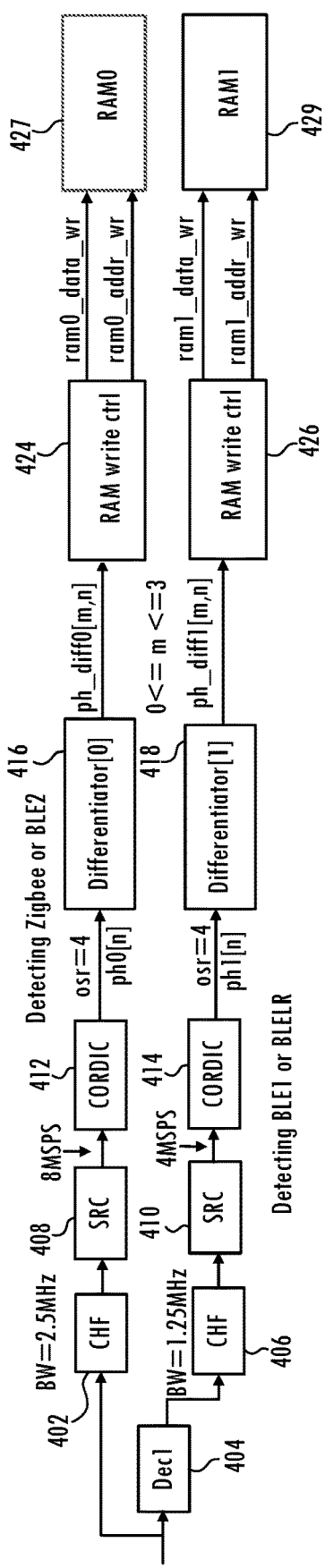
FIG. 6 illustrates the two demodulation paths (Channel-0 path and Channel-1) path and separate RAM memory for each path.
Figure 7:
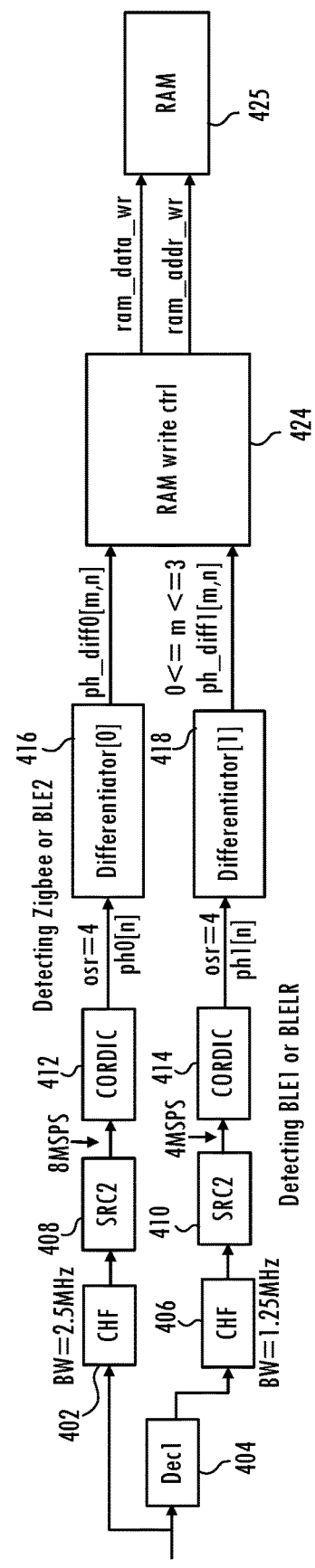
FIG. 7 illustrates the two demodulation paths (Channel-0 path and Channel-1) path and a single RAM memory for both paths.

FIG. 6 illustrates the Channel-0 path and Channel-1 path into RAM0 and RAM1 memory. FIG. 7 illustrates the Channel-0 and Channel-1 path into RAM 425. FIGS. 6 and 7 isolate the path into memory from other circuitry shown in FIGS. 4 and 5.

Referring again to FIG. 4, the correlator bank 422 provides correlator information to the comparators 434, 436, 438, and 440, which compare the output of each of the correlators to appropriate thresholds. For example, comparator 434 receives the outputs from correlators[0:3] and compares the outputs to a threshold for Zigbee (thd_Zigbee). Comparator 436 receives the outputs from correlators[4:7] and compares the outputs to a threshold for BLE2 (thd_BLE2). Comparator 438 receives the outputs from correlators[8:11] and compares the outputs to a threshold for BLELR (thd_BLELR). Comparator 440 receives the outputs from correlators[12:15] and compares the outputs to a threshold for BLE1 (thd_BLE1). Control logic, implemented, e.g., as a finite state machine (FSM) or as programmed microcontroller unit (MCU) 442, receives the outputs from the comparators and MCU 442 controls correlator functionality as described further herein and determines the appropriate action to take based on whether preambles (and sync-words in some cases) for a particular protocol have been received. The MCU 442 controls other functions for the demodulator such as selecting appropriate data streams for the demodulation processors. Note that the correlator bank operates in real time as the data is received from the two demodulator paths—the Channel-0 path and the Channel-1 path. Payload data for demodulation is stored in the RAM before it is sent to the demodulation processors 428, 430, or 432. The MCU 442 also receives outputs from the noise detectors 446 and 448 and the arbitrary symbol identifiers (ASI) 450 and 452. Noise detector 448 detects noise on the Channel-0 path and noise detector 446 detects noise on the Channel-1 path. The actions that occur when noise is detected on one or both of these paths is described further herein.

Noise can be determined in several ways by noise detectors 446 and 448. For example, if the frequency values of the received signal are outside a predetermined range, that may indicate noise. For example, 2FSK (frequency shift keying) modulates the carrier frequency (Fc) by a deviation frequency (Fd), resulting in signals with frequencies of Fc-Fd and Fc+Fd. If the incoming signal has frequencies above Fc+Fd or below Fc-Fd, that may indicate noise. BLE1 and BLELR both have symbol frequency deviation of +/−250 KHz. BLE2 symbols have frequency deviation of +/−500 KHz. The Zigbee chip sequence has +/−500 KHz frequency deviation, which is similar to BLE2. Zigbee is further qualified by correlating with the Zigbee 32-chip sequence. Note that each Zigbee symbol is spread into a 32-chip sequence.

Additionally, BLE and Zigbee have a minimum data bit duration. For example, BLE1 has a bit rate of 1 Mbps, while Zigbee has a bit rate of 250 kbps. However, with DSSS, a 4-bit nibble (symbol) is expanded to 32-chips for a 2 mega chips per second (Mcps). Rapid changes in frequency, especially from positive frequencies to negative frequencies or vice versa, may be referred to as spikes. If the duration of spikes in the incoming signal is less than the minimum bit duration, that may indicate noise.

Thus, in one embodiment, noise detectors 446 and 448 detect noise if the frequency range of the incoming signal is outside the expected range or the bit duration of the incoming signal is less than or exceeds the expected values. Detection of noise is described in U.S. Pat. No. 11,184,272, entitled "Zigbee, Thread and BLE Signal Detection in a WiFi Environment", naming Yan Zhou et al. as inventors, filed Dec. 13, 2018, which patent is incorporated herein by reference. The actions that occur when noise is detected is described further herein.

The ASIs 450 and 452 detect symbols, e.g., from a payload. Zigbee utilizes offset quadrature phase-shift keying (OQPSK), while BLE utilizes 2FSK. By determining whether the incoming data utilizes the sixteen distinct chips specified by Zigbee, it can be determined that the incoming data is a Zigbee symbol. For BLE1 and BLE2, ASI checks if the frequency deviation of multiple averaged symbols falls within a range around fc+fd and fc−fd, respectively. The frequency deviation checking is common for BLE2 and Zigbee. BLE2 is 2 Mbps while Zigbee is 2Mcps. Zigbee ASI has an additional stage to check 32-chip correlation. BLE1 and BLELR both use 1 Mbps 2FSK. BLELR uses digital coding for a lower data rate but more robust detection with improved sensitivity and range. U.S. Pat. No. 11,184,272, entitled "Zigbee, Thread and BLE Signal Detection in a WiFi Environment", naming Yan Zhou et al. as inventors, filed Dec. 13, 2018, which is incorporated herein by reference, describes symbol identification for BLE and Zigbee. Referring back to FIGS. 4 and 5, asynchronous symbol identifier 450 detects arbitrary Zigbee symbols and BLE2 symbols and ASI 452 looks for BLE symbols and BLELR. Note that the ASIs and noise detectors, like the correlators run in real time.

Figures 8, 9:
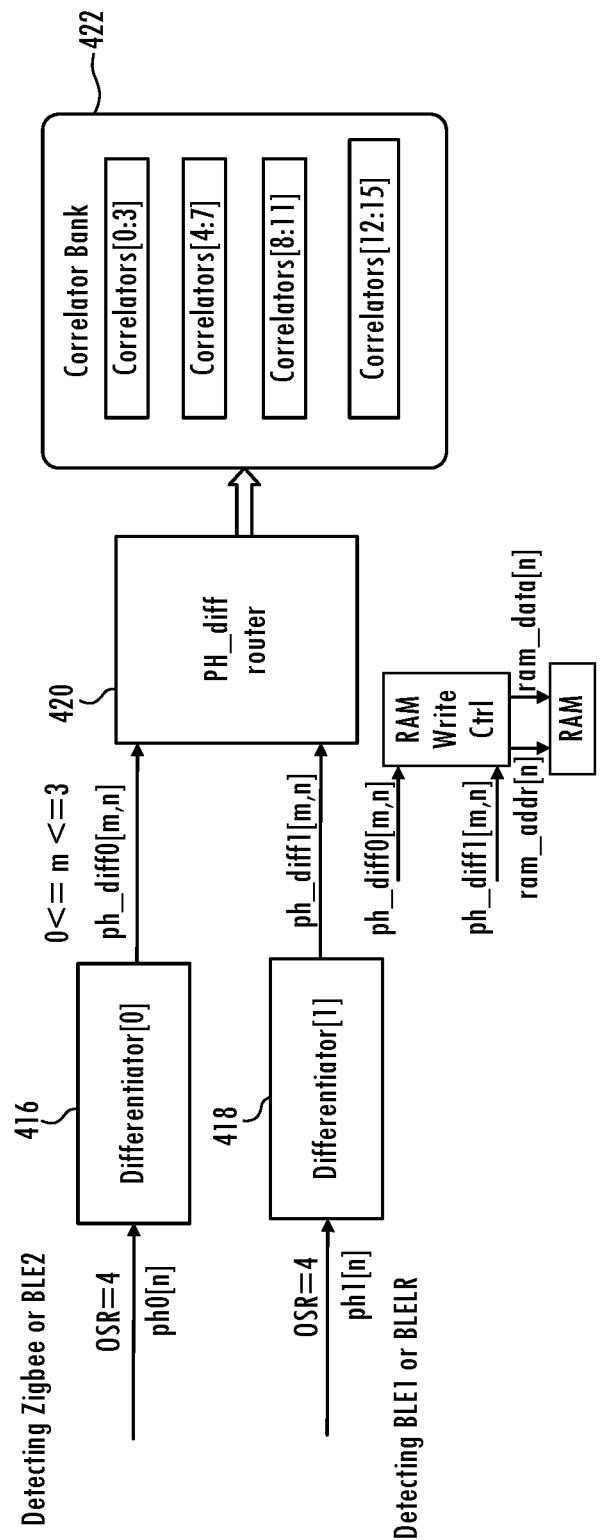
FIG. 8 illustrates the path from the differentiators through the phase difference router to the correlator bank.
FIG. 9 illustrates the number of preamble symbols and possibly sync symbols detected for the various PHYs, the time it takes to detect the symbols, and the number of correlator delay line stages required to detect the symbols.

Referring now to FIG. 8, the path from the differentiators 416 and 418 through the phase difference router 420 to the correlator bank 422 is separated out from other circuitry shown in FIGS. 4 and 5 for ease of reference. FIG. 9 illustrates the number of preamble symbols and potentially sync/access address symbols detected for the various PHYs, (at least initially), the time it takes to detect the symbols based on transmission rate, and the number of correlator delay line stages required to detect the symbols. For BLE, the sync symbols are the access address, which is a constant in ADV channels. Each of the Zigbee symbols is made of 32 chips and the chip rate is 2 Mchips/s, so each chip is 0.5 µs and each symbol is 16 µs. For BLELR, each symbol is four chips and the 12 symbols shown includes 10 preamble symbols (80 µs) and 2 sync-words (16 µs) for a total of 96 µs. The chip rate for both BLELR 125 Kbps and BLELR 500 Kbps is 1Mcps (MegaChipsPerSecond). Note that the coded preamble symbol for BLELR is 00111100.

Referring back to FIG. 8, correlators[0:3] compute 3 Zigbee symbols correlations. Correlators[4:7] compute 32 BLE2 symbols correlations. Correlators[8:11] compute 12 BLELR symbols correlations. Correlators[12:15] compute 32 BLE1 symbols correlations. In the illustrated embodiment in FIG. 8, the OSR=4. The phase difference router (PH_diff Router) 420 operates as follows:

for Correlators[0:3]: Correlator[m][n]=ph_diff0[m,n];
for Correlators[4:7], Correlator[m+4][n]=ph_diff0[m,n];
for Correlators[8:11], Correlator[m+8][n]=ph_diff1[m,n];
for Correlators[12:15], Correlator[m+12][n]=ph_diff1[m,n].

Thus, Correlators[0:3] and Correlators[4:7] receive Channel-0 data and
Correlator[8:11] and Correlators[12:15] receive Channel-1 data.

Figure 10:
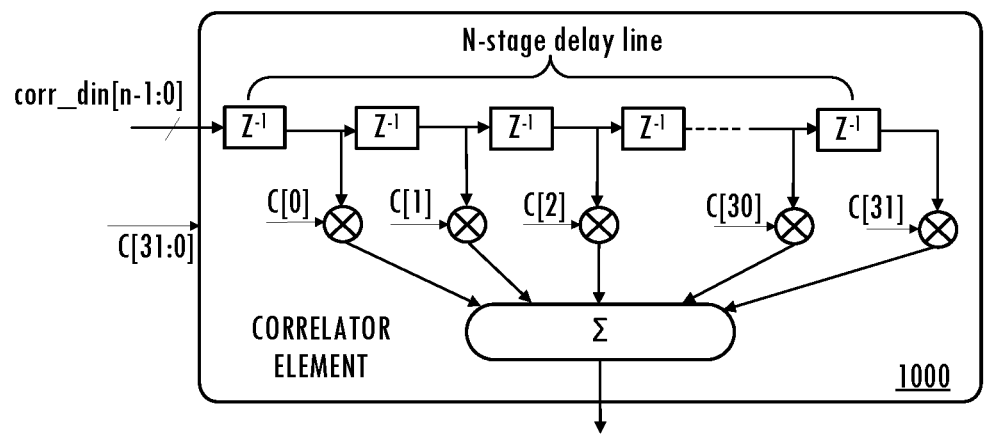
FIG. 10 illustrates an embodiment of a correlator element.

FIG. 10 illustrates an embodiment of a correlator element 1000. Correlator element 1000 is a matched FIR filter of length M=32 (order 31). The correlator element 1000 works in "matched filter" mode and computes true correlation of the signal $corr_{din(n-k)}$ supplied from the phase difference router 420 (see FIG. 8) with the template signal c(k) for the duration of the whole symbol sequence. If c(k)=1, the matched filter becomes an average filter and the correlator then works in "average filter" mode. In the implementation, the template signal c(k) is the expected preamble or sync-word or combination of preamble and sync-word, and will be either a binary "1" or a binary "0" and therefore no multiplier is required. The correlator element 1000 is able to process one Zigbee symbol, 4 BLELR symbols, 32 BLE1 symbols, or 32 BLE2 symbols.

Figure 11:
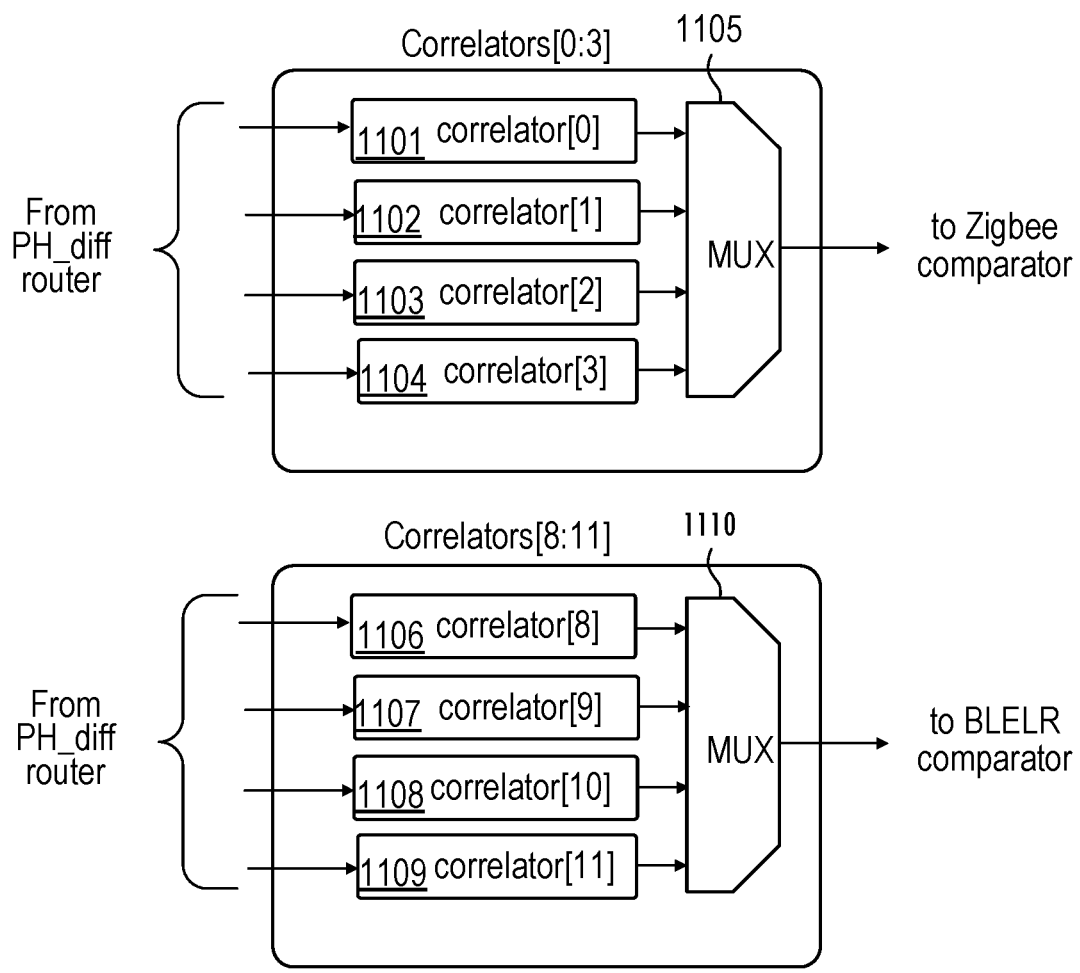
FIG. 11 shows correlators forming a portion of the correlator bank and a multiplexer.
Figure 12:
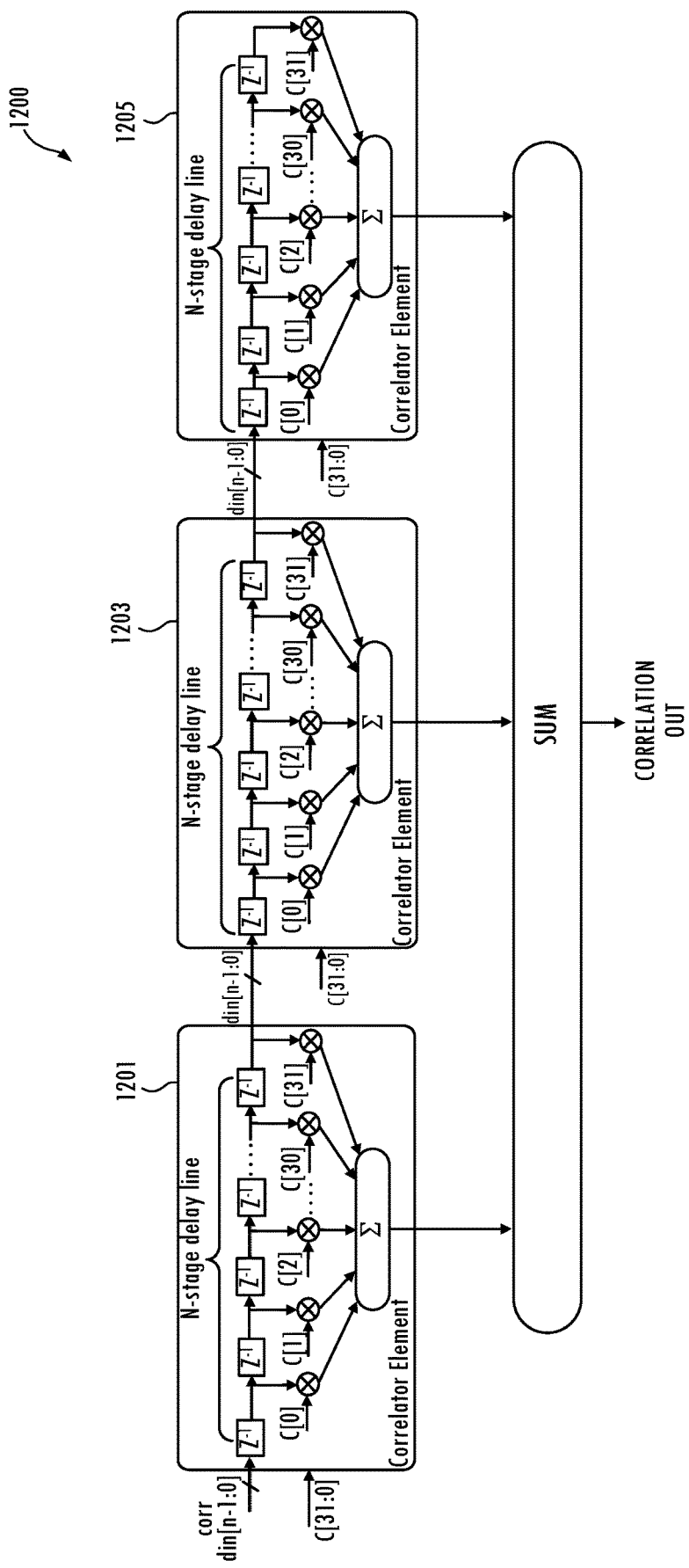
FIG. 12 shows a correlator formed of three correlator elements.

FIG. 11 shows correlators[0:3] formed of four correlators 1101, 1102, 1103, and 1104 and a multiplexer 1105 to select which correlator output goes to the comparator 434 (see FIG. 4), which compares the correlator output to the threshold thd_Zigbee. There are four correlators based on the OSR of 4, one for each sample. Correlators [8:11] are formed of four correlators 1106, 1107, 1108, and 1109 and a multiplexer 1110 to select which correlator output goes to the comparator 438 (see FIG. 4) to compare the correlator outputs to thd_BLELR. The structure of these correlators is identical. While FIG. 10 shows a single correlator element 1000, FIG. 12 shows a correlator 1200 formed of three correlator elements 1201, 1203, and 1205. Each of the correlator elements shown in FIG. 11 can be configured as one correlator element 1000 or configured as three correlator elements as illustrated by correlator 1200 in FIG. 12.

With reference again to FIG. 4, assume as an example that the Zigbee preamble is being detected by correlators[0:3]. Initially, the number of symbols required is short to reduce detection time. For example, in an embodiment the number of correlator elements for correlators [0:3] is initially set at one. One correlator element can detect one Zigbee preamble symbol. The output of a correlator element from each of the correlators[0:3] is compared to the threshold thd_Zigbee in comparator 434. If one (or more) of the outputs of correlators [0:3] is greater than the first threshold used for 1-symbol correlation, MCU 442 determines a first symbol of the Zigbee preamble has been detected. Once one symbol has been detected, in order to achieve more robust detection, the 1-symbol correlation is extended to 3-symbol correlation and the correlators [0:3] are reconfigured to be 3 element correlators as shown in FIG. 12. In an embodiment, the first threshold for the initial 1-symbol detection is lower than for the 3-symbol detection. That creates a bias for false positives for the 1-symbol detection. The threshold is then changed to a second threshold for the 3-symbol detection to reduce the chances for false positives. A valid detection is declared once the long correlation (3-symbol) output is greater than the second threshold. Extending the correlation to 3-symbol correlation provides a lower false detection rate and more accurate initial timing. While correlation length extension for Zigbee detection has been described, correlation length extension can also be used with BLELR to extend the correlation from 4-symbols to 12-symbols if a valid detection is found initially for the four symbols. In embodiments, the thresholds are again changed between 4-symbol and 12-symbol detection so the initial correlation is biased for false positives but the longer correlation is more robust and provides for a lower false detection rate and more accurate initial timing.

The correlation can be further extended to achieve even more robust detection. For example, with reference to FIG. 13, for IEEE 802.15.4, the 3-symbol correlation is extended to an 8-symbol correlation. With BLELR, the correlation can be extended from 12-symbols to 32-symbols. A shorter correlation length and lower threshold is used initially to shorten detection time with a bias towards false positives. To provide more robust detection, the correlation length is extended if the short correlator output (3-symbol) is greater than the second threshold as described above. A valid detection is declared once long correlation (8-symbol) output is greater than the 8-symbol correlation threshold. The 8-symbol correlation provides even greater precision in preamble detection. The threshold for 8-symbol correlation in an embodiment is higher than for 1-symbol correlation and for 3-symbol correlation. There will be cases where extended correlation to 8-symbol correlation will not be possible because, e.g., a Zigbee packet has been transmitted before the receiver switched to the desired channel. In that case, 3-symbol correlation is used.

Figure 13:
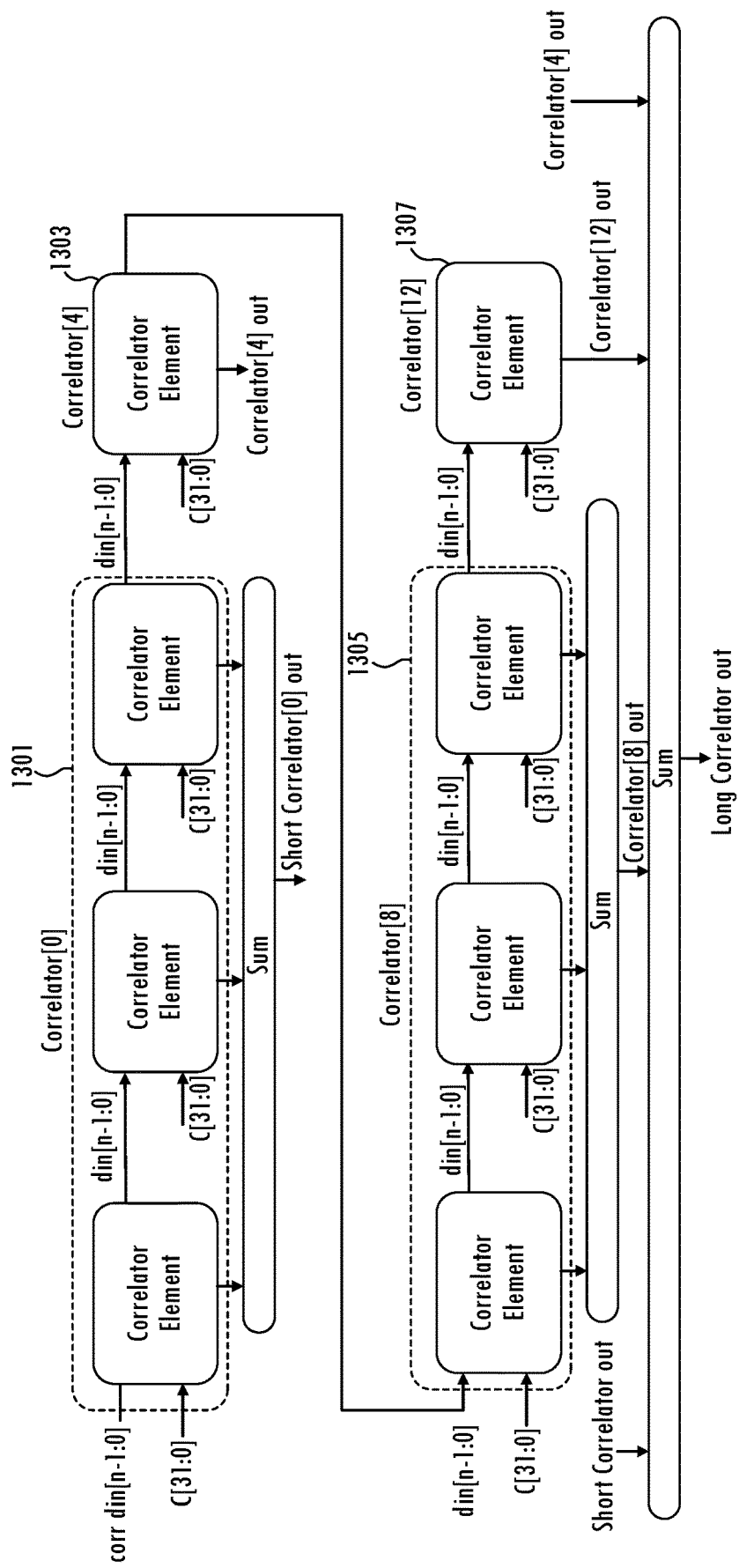
FIG. 13 illustrates how the correlator bank is utilized for an extended correlation.

With reference to FIGS. 4 and 13, when the correlation is extended from 3-symbol to 8-symbol, additional correlators are required to be combined with correlators [0:3]. Thus, for 8-symbol correlation correlator [0] 1301 (configured as a three element correlator) is combined with correlator [4] 1303 with one correlator element, and combined with correlator[8] 1305 configured as a three element correlator and combined with correlator [12] 1307 with one correlation element. Similarly, correlator [1] (configured as a three element correlator) is combined with correlator [5] with one correlator element, correlator[9] configured as a three element correlator, and correlator [13] with one correlation element. Correlator [2] (configured as a three element correlator) is combined with correlator [6] with one correlator element, and combined with correlator[10] configured as a three element correlator, and combined with correlator [14] with one correlation element. Correlator [3] (configured as a three element correlator) is combined with correlator [7] with one correlator element, and combined with correlator [11] configured as a three element correlator and combined with correlator [15] with one correlation element. Once the 3-symbol correlation detection occurs for Zigbee, the other correlators [4:7], correlators [8:11], and correlators [12:15] are made available for uses for detecting Zigbee symbols instead of their normal use for BLE2, BLELR, or BLE1. Note that false detection requirements for certain protocols, e.g., Zigbee, can be more stringent than for other protocols, e.g., BLE.

Referring now to FIG. 14, the table illustrates an exemplary detection timetable for various components shown in FIGS. 4 and 5. The components include the noise detectors (ND) 446 and 448, the preamble symbol identifier (PSI) provided by the correlator bank 422 for the various PHYs, e.g., for the first Zigbee symbol, the first extended correlator length (correlator bank stage 1 (CBS_1)), e.g., extended to 3 symbols for Zigbee, the second extended correlator length (correlator bank stage 2 (CBS_2)), e.g., extended to 8 symbols for Zigbee, and the ASI blocks 450 and 452 to detect symbols present in the payload for the various PHYs. Note that the PSI, CBS_1 processing, and ASI processing are multi-PHY processing that occurs in parallel. However, CBS_2 is performed on only one PHY as described above, e.g., for the extended 8-symbol correlation for Zigbee. In embodiments shortened detection times, e.g., CBS_1 or even PSI, are used where shortened detection times are desired and the longer correlation times, e.g., 3-symbol or 8-symbol are used where more robust detection is desired and longer detection times are acceptable.

In the PSI detection stage, the Zigbee correlators[0:3] computes 1 Zigbee preamble symbol correlation. The BLE2 correlators[4:7] computes 12 BLE2 preamble symbols correlation. The BLELR correlators[8:11] computes 4 BLELR preamble symbols correlations. The BLE1 correlators[12:15] computes 12 BLE1 symbols (8 preamble symbols+4 sync-word symbols) correlations.

In the CBS_1 detection stage, which is the first correlation extension, the Zigbee correlators[0:3] computes 3 Zigbee preamble symbols correlations. The BLE2 correlators[4:7] computes 32 BLE2 symbols (16 preamble symbols+first 16 sync-word symbols) correlations. The BLELR correlators [8:11] computes 12 BLELR symbols (8 preamble symbols+ first 4 sync-word symbols) correlations. The BLE1 correlators[12:15] computes 32 BLE1 symbols (8 preamble symbols+24 sync-word symbols) correlations.

Entering the Zigbee CBS_2 detection stage, which is the second correlation extension, requires one or more of the Zigbee correlators [0:3] to pass the Zigbee threshold in the CBS_1 detection stage. If that occurs, correlators [4:7], correlators [8:11] and correlators [12:15] are combined to compute 8 Zigbee symbols (8 Zigbee preamble symbols or 6 symbols and 2 Zigbee sync-word symbols correlations.

Entering the BLELR CBS_2 detection stage requires at least one of the correlators [8:11] in the CBS_1 detection stage to pass the BLELR threshold. If that occurs, correlators [0:3], correlators [4:7], correlators [8:11] and correlators [12:15] are combined to compute 32 BLELR sync-word symbols correlations.

If one or more of the BLE2 correlators [4:7] in the CBS_1 detection stage passes the BLE2 threshold, correlators [4:7] compute 32 BLELR sync-word symbols in the CBS_2 BLE2 detection stage.

If one or more of the BLE1 correlators [12:15] in the CBS_1 detection stage passes the BLE1 threshold, correlators [12:15] compute 32 BLE1 sync-word symbols.

Figure 15A:
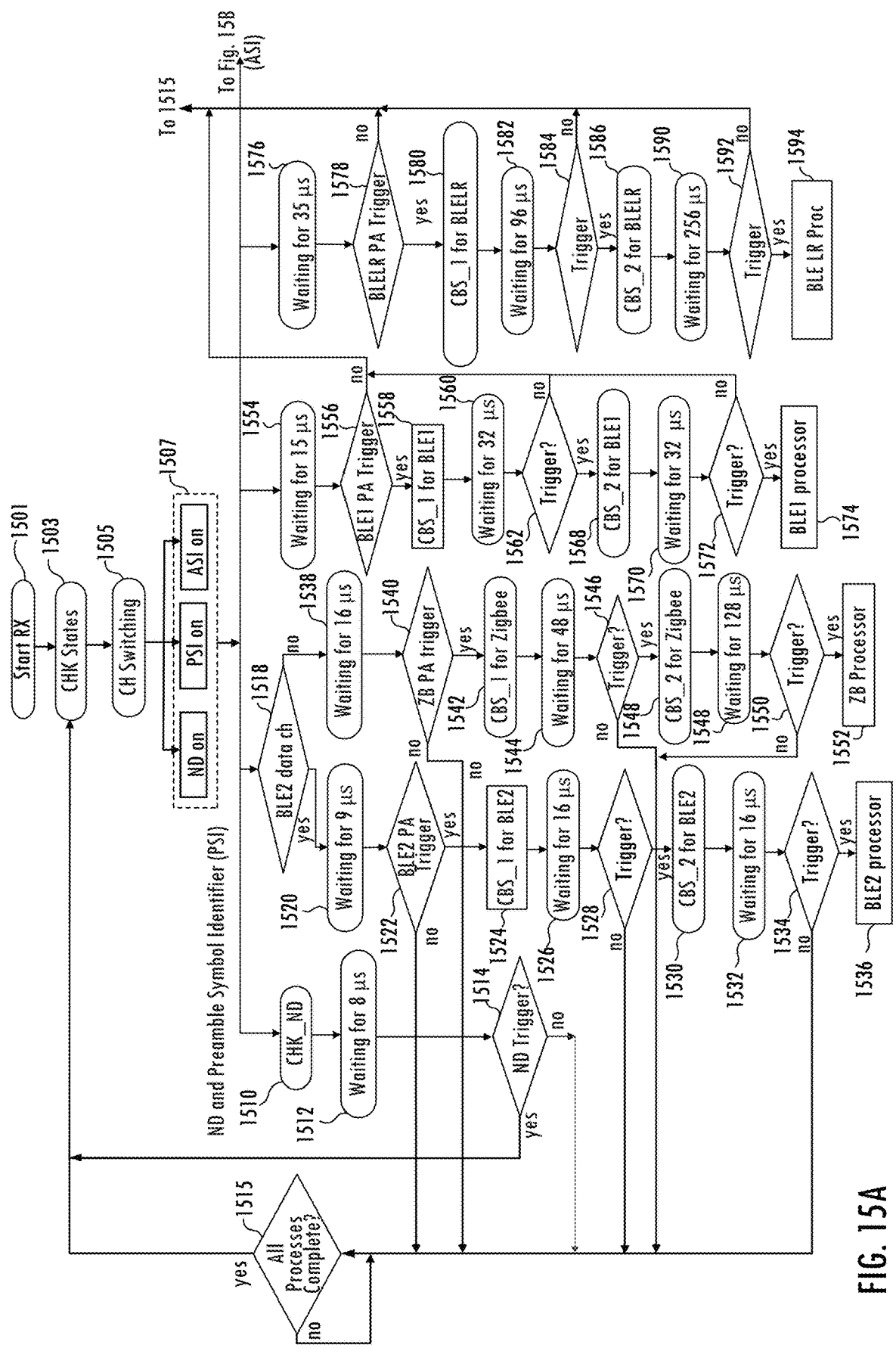
FIG. 15A illustrates a control flow associated with a context switch for the demodulation including noise detection, preamble symbol identification, and extended correlations.
Figures 15B, 16:
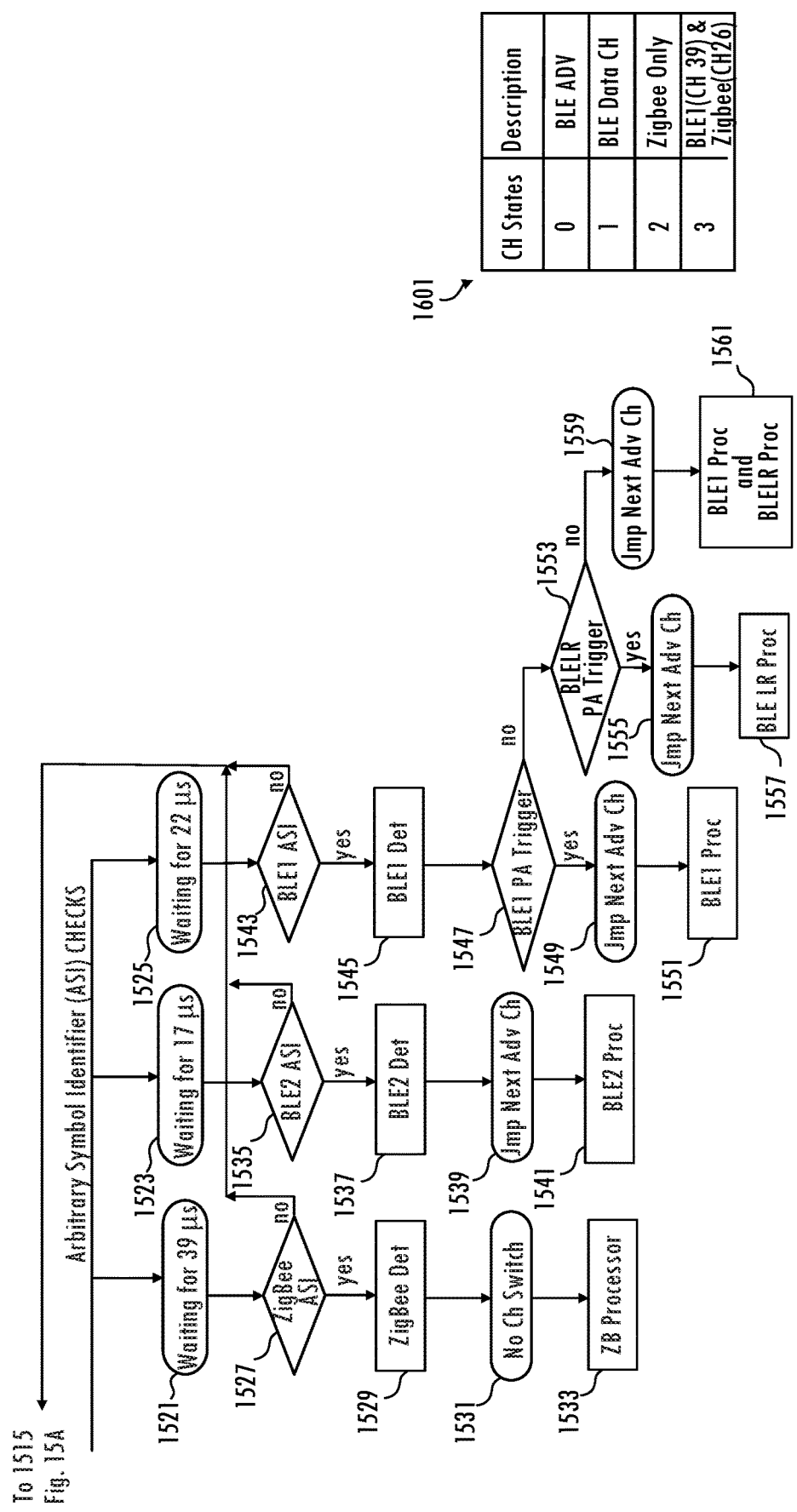
FIG. 15B illustrates a control flow associated with a context switch showing arbitrary symbol identification.
FIG. 16 illustrates various channel states associated with the context switch shown in FIGS. 15A and 15B.

FIGS. 15A and 15B illustrate a flow chart of context switching for the demodulation and related functions. The flow starts when the receiver is ready to receive transmissions at 1501. The flow then goes to check states 1503. FIG. 16 shows the various channel states at 1601 as 0 to 3, corresponding respectively to BLE advertising channels, BLE data channels, Zigbee only, and the channel 2480 MHz, which is BLE1 channel 39 and Zigbee channel 26. CH state 1503 provides information for CH switching 1505. If CH state-0 (BLE ADV), the demodulator is set to listen BLE advertisement traffic. Since there are 3 advertisement channels, the MCU decides which advertisement channel to jump to next during CH switching 1505. If CH state=1 (BLE data channel), the demodulator is set to receive BLE data traffic. The MCU decides which is the next BLE data channel selected during CH switching 1505. If CH state=2, the demodulator is set to receive Zigbee traffic. The MCU decides which is the next Zigbee channel for CH switching 1505. CH state-3 indicates the shared channel shared by BLE CH39 and Zigbee CH26. The demodulator should be programmed to listen to both BLE and Zigbee traffic.

At 1505, the receiver switches to the desired frequency corresponding to the selected channel. At 1507 the controller, e.g., MCU 442 in FIGS. 4 and 5, turns on the noise detectors (NDs), preamble symbol identifiers (PSIs), and the arbitrary symbol identifiers (ASIs). The controller then receives outputs from the NDs, PSIs, and ASIs at different times based on how long each task takes to complete. Those functions run in parallel but finish at different times. The detection times for the various tasks described in FIGS. 15A and 15B are shown in the detection timetable in FIG. 14. In CHK ND 1510 the noise detectors check for the presence of noise in the selected channel. In 1514, the controller checks for the output of the noise detectors. As shown in FIG. 14, the noise detection waits 8 μs for the detection process to complete in 1512. If both noise detectors indicate noise is present (ND Trigger is yes) in 1514, the flow returns to CHK States 1503. If neither noise detector triggers or only one noise detector triggers, the controller assumes no noise is present and the other processes continue. A no in 1514 causes the controller to take no action and wait for the other processes to complete in 1515.

In 1518 a check is made to see if a BLE2 data channel was selected. If so, the wait for detection in 1520 is 9 μs for BLE2 PSI (12 symbols) and the BLE2 PSI trigger is checked in 1522. If no trigger, the flow goes to 1515 and waits for the other processes to complete. If the preamble symbols (BLE2

PA) were detected (yes in 1522) then the first cross correlation extension is utilized for BLE2 shown as Correlator Bank Stage 1 (CBS_1) at 1524. After waiting for 16 μs in 1526, if a detection trigger was yes for CBS_1 in 1528, the second cross correlation extension CBS_2 turns on for BLE2 at 1530. As shown in FIG. 14, the detection time in 1532 is 16 μs for BLE2 CBS_2. If CBS_2 triggers in 1534, the controller turns on the BLE2 processor in 1536 and if CBS_2 does not trigger in 1534 the flow goes to 1515 to wait for all the processes to complete.

If the check for a BLE2 data channel in 1518 was no, the system looks for a Zigbee preamble symbol. The detection time for the first Zigbee preamble symbol in 1538 is 16 μs. After waiting for the required time, the process checks to see if the Zigbee PSI triggered in 1540 and if so, turns on CBS_1 for Zigbee in 1542. If the Zigbee PSI did not trigger in 1540, the process goes to 1515 waiting for all the processes to complete. The detection time for Zigbee CBS_1 is 48 μs as shown at 1544. The controller checks for a trigger in 1546 and if CBS_1 triggers, the controller enables the second cross correlation extension CBS_2 for Zigbee in 1548. If the Zigbee CBS_1 did not trigger in 1546, the process goes to 1515 waiting for all the processes to complete. After waiting 128 μs in 1548, the controller checks for a CBS_2 trigger in 1550 and if CBS_2 triggered, the controller turns on the Zigbee processor in 1552. If no trigger occurs, the flow returns to 1515 waiting for all the processes to complete.

The BLE1 PSI detection time takes 15 μs in 1554. After the required detection time, if the BLE1 PSI triggered in 1556, the controller turns on CBS_1 for BLE1 in 1558. If the BLE1 PSI did not trigger in 1556 the process goes to 1515 waiting for all the processes to complete. The detection time for BLE1 CBS_1 is 32 μs as shown at 1560. The controller checks for a trigger in 1562 and if CBS_1 triggers, the controller enables the second cross correlation extension CBS_2 for BLE1 in 1562. If the BLE1 CBS_1 did not trigger in 1562, the process goes to 1515 waiting for all the processes to complete. After the CBS_2 detection time of 32 μs in 1570, the controller checks for a CBS_2 trigger in 1572 and if CBS_2 triggered, the controller turns on the BLE1 processor in 1574. If BLE1 CBS_2 did not trigger, the flow returns to 1515 waiting for all the processes to complete.

The BLELR PSI detection time takes 35 μs in 1576. After the required detection time, if the BLELR PSI triggers in 1578, the controller turns on CBS_1 for BLELR in 1580. If the BLELR PSI did not trigger in 1578 the process goes to 1515 waiting for all the processes to complete. The detection time for BLELR CBS_1 is 96 μs as shown at 1582. The controller checks for a trigger in 1584 and if CBS_1 triggers, the controller enables the second cross correlation extension CBS_2 for BLELR in 1586. If the BLELR CBS_1 did not trigger in 1584, the process goes to 1515 waiting for all the processes to complete. After the CBS_2 detection time of 256 μs in 1590, the controller checks for a CBS_2 trigger in 1592 and if CBS_2 triggered, the controller turns on the BLELR processor in 1594. If BLE1 CBS_2 did not trigger, the flow returns to 1515 waiting for all the processes to complete. Note that in 1515 the process checks if all processes (ND, PSI through CBS_2, and ASI) have completed and if so returns to CHK states 1503. Of course, if any of the demodulation processors are turned on, after CBS_2 or ASI causes other demodulation activities, the wait for processes to complete in 1515 ends. Note that not all protocols require the second or even the first cross correlation extension. Thus, e.g., for BLE1 and BLE2, the demodulation processors may be turned on based on a CBS_1 trigger or even a PSI trigger.

Referring now to FIG. 15B, the flow for ASI is illustrated. Note that ASI is running concurrently with ND and PSI. ASI in general takes a longer time to detect than the first stage PSI. However, ASI detection may be shorter than extended PSI detection. The wait times for arbitrary symbol identification for Zigbee, BLE2, and BLE1 are shown at 1521, 1523, and 1525, respectively. The system checks to see if a Zigbee symbol was detected in 1527. If a Zigbee preamble symbol is received, Zigbee 1-symbol PSI should be triggered first followed by ASI in 1527. Once the 1-symbol PSI triggers, the state machine is programmed to use 3-symbol PSI detection and the state machine waits for 3-symbol PSI detection results regardless if ASI triggers. PSI detection has higher priority than ASI. If yes in 1527 and assuming no extended PSI correlation, the system goes to a Zigbee detect state in 1529, causing the system to stay on the same channel in 1531 (no channel switch) and turns on the Zigbee processor in 1533 for demodulation. There is no channel switch in an effort to capture the medium access control (MAC) retry. A time-out (e.g., approximately 15.5 ms) is utilized in case the retry packet is not sent or was not detected and if the retry packet was not sent, the control returns to 1503. If a CBS_2 PSI detection is used and triggered in FIG. 15A (see 1550), the state machine exits the ASI flow since PSI has a higher priority. If no Zigbee ASI trigger in 1527, the flow goes to 1515 waiting for all the processes to complete.

In 1535, the system checks for a BLE2 ASI trigger. If no BLE2 ASI trigger is detected, the system goes to 1515 to wait for completion. If a BLE2 ASI trigger was detected, the system goes to a BLE2 detect state in 1537, jumps to the next advertising channel in 1539, and turns on the BLE2 processor in 1541. In the current BLE specification, BLE2 is not allowed on BLE advertisement channels. However, future systems may include that functionality. Note that a time-out is needed after switching to next advertisement channel. However, there is not a set time for a transmitting device to repeat the message on next advertisement channel. Accordingly, in embodiments the timeout is programmable between at least several tens of μs up to several ms. If the BLE2 processor times out, the flow returns to 1503.

In 1543 the system checks for detection of a BLE1 symbol. If no BLE1 symbol is detected, the system goes to 1515 to wait for all the context switch processes to complete. If BLE1 ASI triggered in 1543, the system goes to a BLE1 detect state in 1545. In 1547 the system checks for a BLE1 PA trigger. The BLE1 trigger check in 1547 in FIG. 15B is the same as the BLE1 PA trigger check in 1556 in FIG. 15A. In the event an ASI detects BLE1 or BLELR traffic, the ASI cannot tell the difference. Therefore, the state machine checks if PSI has information to determine if BLE1 or BLELR preambles are detected (but won't be able to detect the packet). That information is used to determine which demodulator to use to detect incoming traffic next. In general, this is rare case event. "BLE1 PA", "BLE2 PA" and "ZB PA" detection are used in the PSI detection stage. In the PSI detection stage, the correlator element 1000 is configured to process 12 symbols correlation for BLE1 or BLE2 by setting c(k)=0 for 12<=k<=31. Note that the correlation can also be performed as described in U.S. Pat. No. 11,177,993, filed Oct. 31, 2018, naming Hendricus de Ruijter et al. as inventors, entitled "APPARATUS FOR RADIO FREQUENCY RECEIVER WITH IMPROVED TIMING RECOVERY AND FREQUENCY OFFSET ESTIMATION AND ASSOCIATED METHODS" which application is incorporated herein by reference. If a BLE1 preamble was detected in 1547, the system jumps to the next advertising channel in 1549, and turns on the BLE1 demodulation processor in 1551. If no BLE1 PA trigger occurred in 1547, the system checks in 1553 if a BLELR PA trigger was detected in the BLELR PA trigger check 1578 shown in FIG. 15A. If the check in 1553 indicates a BLELR PA trigger, the flow jumps to the next advertising channel in 1555 and turns on the BLELR processor in 1557. Note that a time-out is needed after switching to next ADV channel. In embodiments the timeout is programmable between at least several tens of μs up to several ms. If the check in 1553 indicates no BLELR PA trigger, the flow goes to the next advertising channel in 1559 and turns on both demodulation processors (BLE1 demodulation processor and BLELR demodulation processor) are turned on in 1561. Note that a time-out is needed after switching to the next ADV channel. In embodiments the timeout is programmable between at least several tens of μs up to several ms.

While the description above focuses on concurrent 802.15.4 and BLE monitoring, the approach can also be considered for subG frequency band applications. In the subG frequency band, 2GFSK, OQPSK, ASK, and other modulation schemes are used and co-exist. The demodulator architecture described for the industrial, scientific and medical (ISM) frequency band herein can be readily adapted to quickly identify various modulation signals in SubG frequency bands. Once no desired signal is detected in a channel in the frequency band of interest, the demodulator can be switched to a different channel and search for any potential communication traffic. Thus, the CHK states channel and description shown in FIG. 16 depends on the particular transmission protocols and the frequencies of interest.

Figure 17:
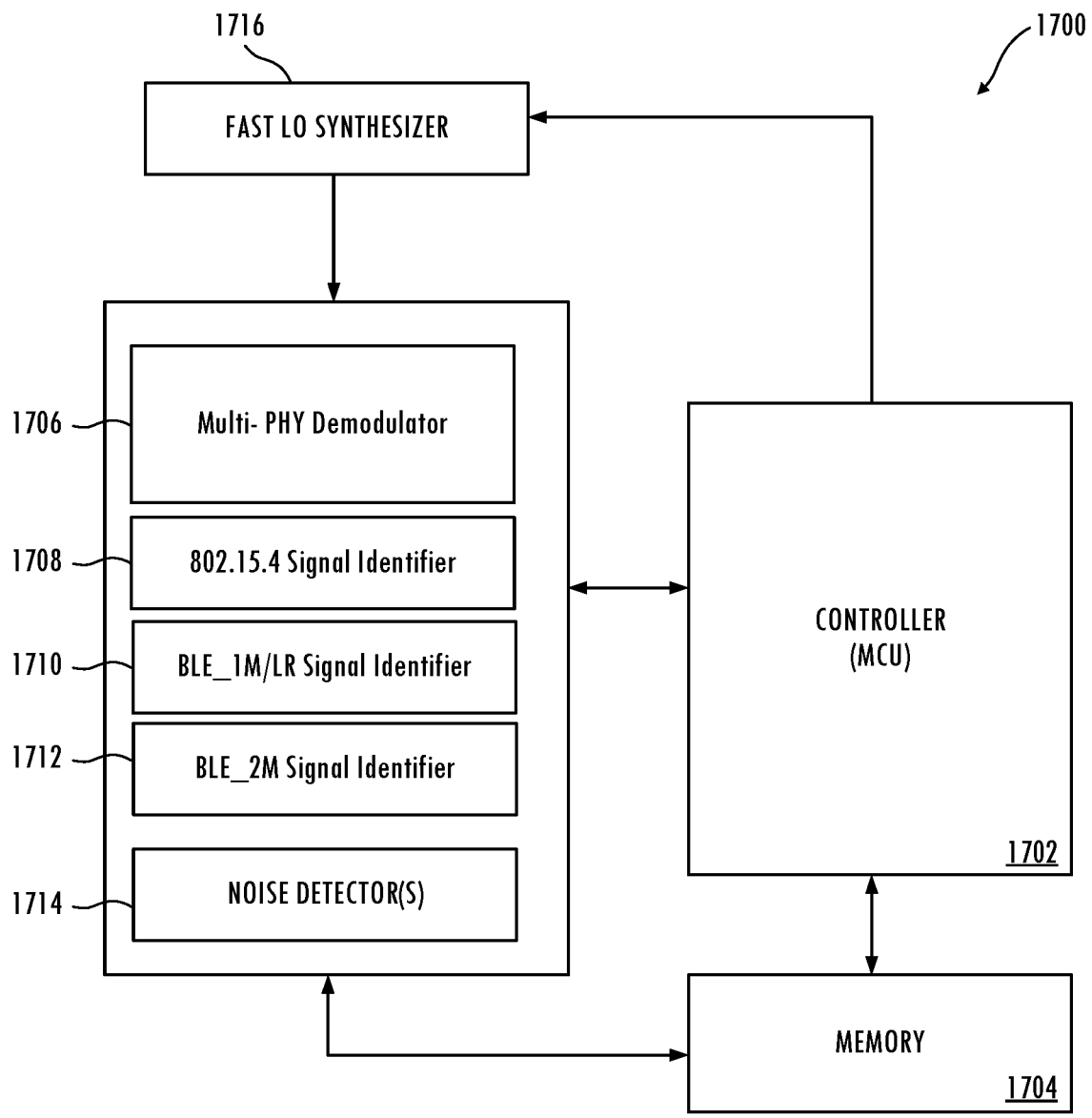
FIG. 17 illustrates an overall control structure for an embodiment of a wireless communication device with concurrent listening capabilities.

While the above description has focused on details of the multi-PHY demodulator along with how the signal identifiers and noise detectors operate with the multi-PHY demodulator, FIG. 17 illustrates the overall control structure 1700 for an embodiment of a wireless communication device with concurrent listening capabilities. The controller 1702, which may be the MCU 442 shown in FIG. 4, or an additional programmed MCU or other processor (and/or additional control logic) that operates in conjunction with MCU 442, controls the overall system for concurrent listening. Of course, the system also transmits and receives data when the listening operations indicate there is data to be transmitted or received by the wireless communication device. Memory 1704 stores program code and data used by the controller 1702. In addition, the memory 1704 stores various transmit and receive parameters for the wireless communication device.

The controller receives data from the multi-PHY demodulator 1706, the signal identifiers 1708 and 1710, the noise detectors 1714 and controls the channel sequence for concurrent listening and for transitioning the concurrent listening to transmitting and/or receiving and then returning to concurrent listening. BLE transmissions on DATA channels and IEEE 802.15.4 transmissions are schedulable and schedulable events pre-empt background concurrent listening. In operation, the listening switches to a target channel looking for receipt of preambles/symbols as described earlier, dwells on that channel for a predetermined time period, or until preambles, symbols, or noise is received. After the predetermined time period expires or on receipt of noise, the controller 1701 causes the wireless communication device to switch to the next target receive (RX) channel by changing the frequency of the fast-switching LO synthesizer 1716 and for at least some embodiments, loading demodulator parameters associated with the target frequency.

Figure 18A:
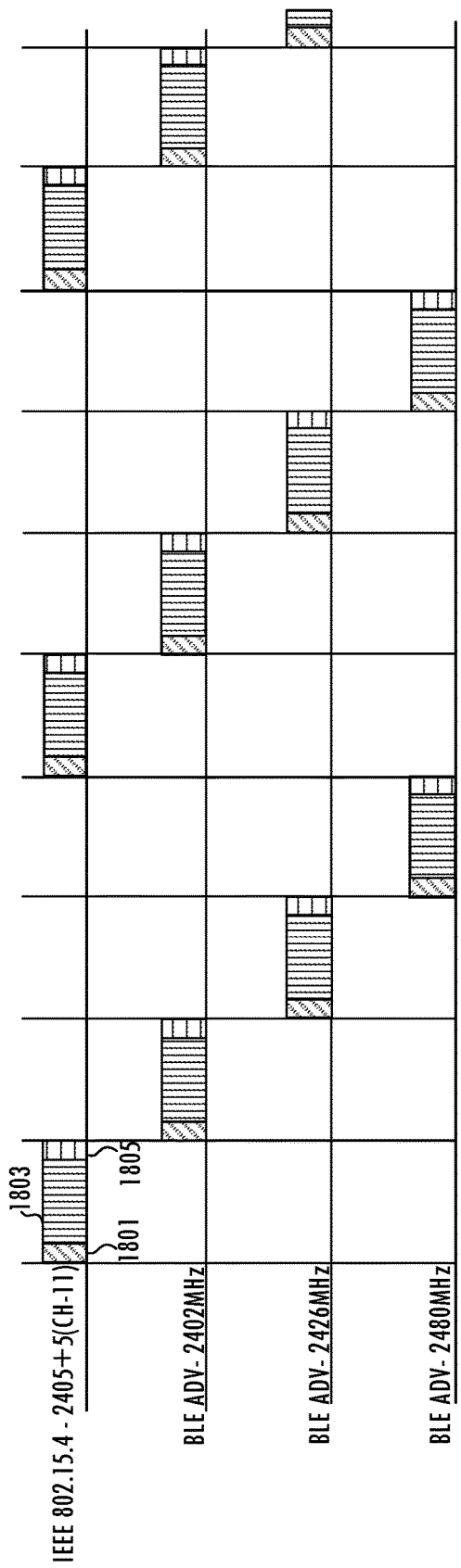
FIG. 18A illustrates an example of channel switching operations for concurrent listening.
Figure 18B:
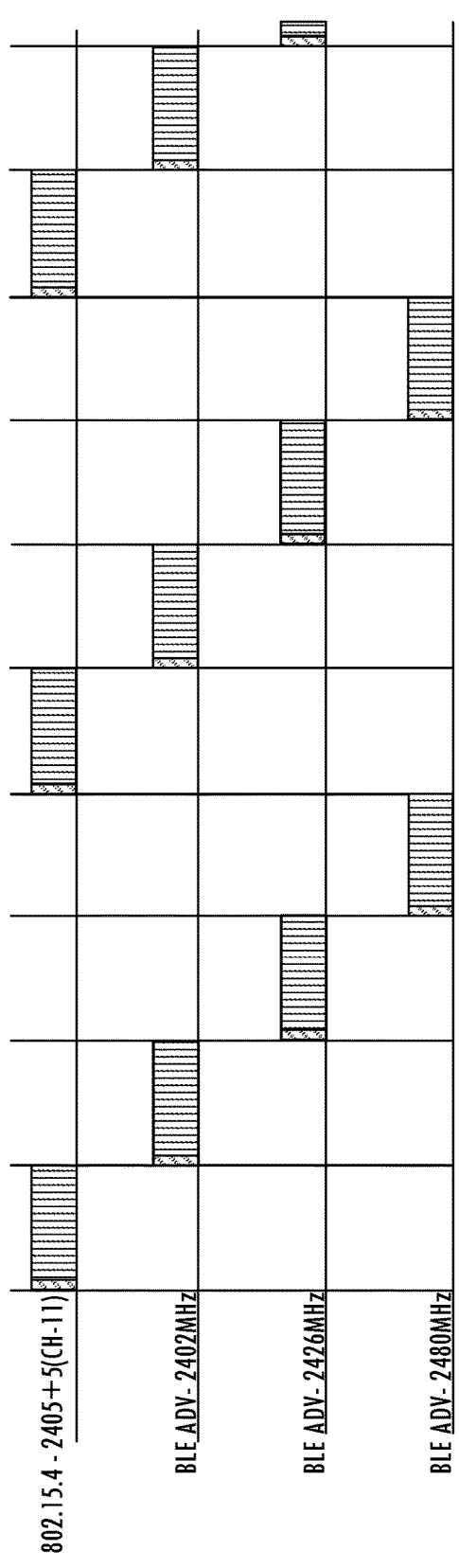
FIG. 18B illustrates an example of channel switch operations for concurrent listening with the context saving step omitted from the figure.

FIG. 18A illustrates an example of channel switching for concurrent listening. FIG. 18A shows the channel switch executed at 1801, the dwell time at 1803, and a context save at 1805 for an IEEE 802.15.4 channel. The channel switch includes the time to switch the local oscillator to the desired RX channel and loading of any demodulator parameters required for receiving transmissions on the new target RX channel. That sequence is repeated for each target RX channel. FIG. 18A shows an equal priority being given to the IEEE 802.15.4 channel and BLE ADV channels. The IEEE 802.15.4 channel selected is shown as 2405 MHz+(5 MHz× (CH−11)) where CH is the selected channel and is one of channels 11 to 26 and channel 11 is the first channel (lowest frequency) as shown in FIG. 3. For example, if channel 15 is selected, that equates to (2405+5×4) or 2425 MHz. Note that embodiments as shown in FIG. 18A include a demodulator for which context is saved for each channel. The context includes such factors as automatic gain control (AGC) parameters, channel filter parameters, and of course frequency. For embodiments that use the multi-PHY demodulator described herein the context saving step can be omitted as shown in FIG. 18B. In embodiments, the context save is implemented in direct memory access (DMA) between the memory 1704 and the demodulator 1706. That makes the context save and reload more efficient.

Figure 19A:
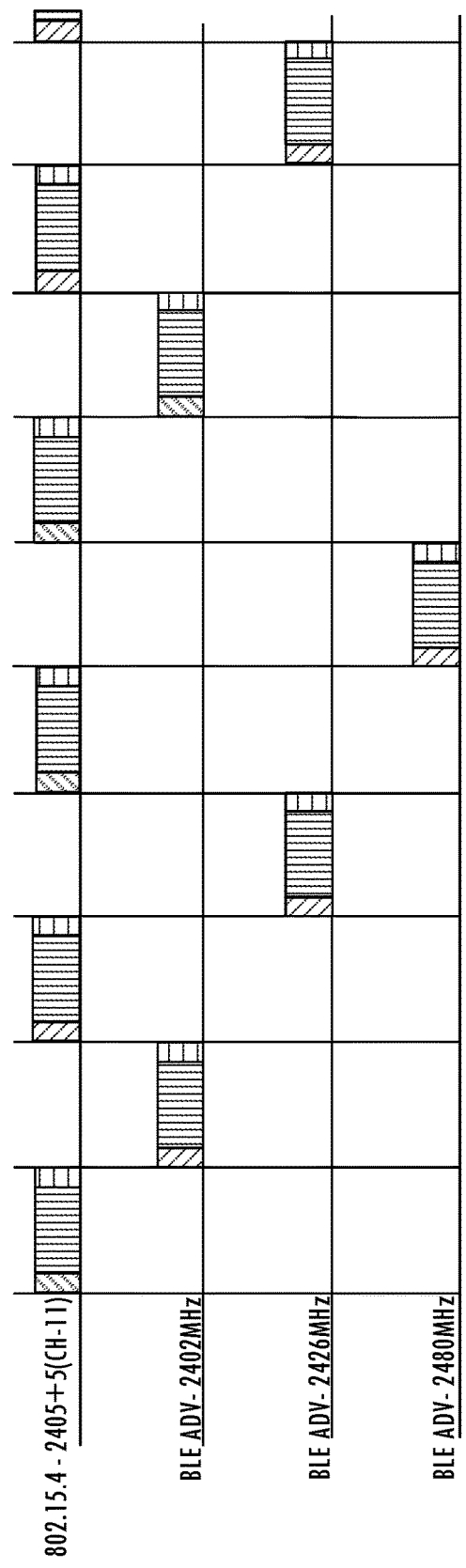
FIG. 19A illustrates an embodiment for channel switching for concurrent listening for one IEEE 802.15.4 channel and three BLE ADV channels.
Figure 19B:
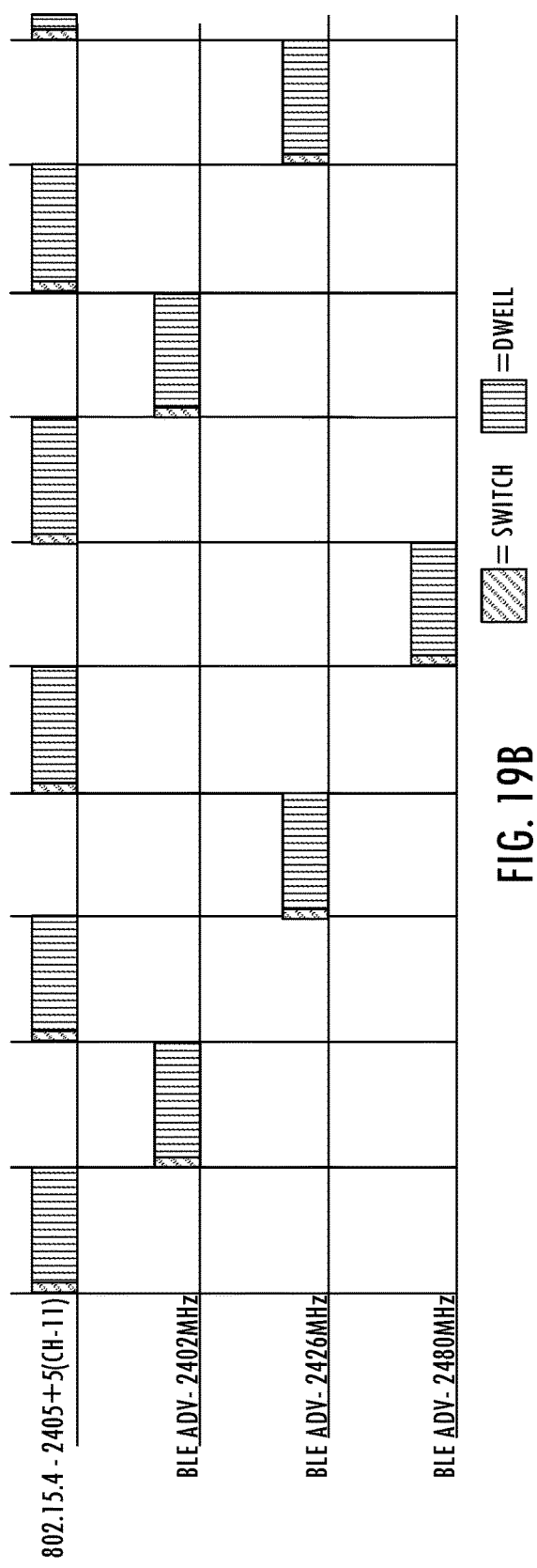
FIG. 19B illustrates the same channel switching as FIG. 19A with the save context step omitted.
Figure 20:
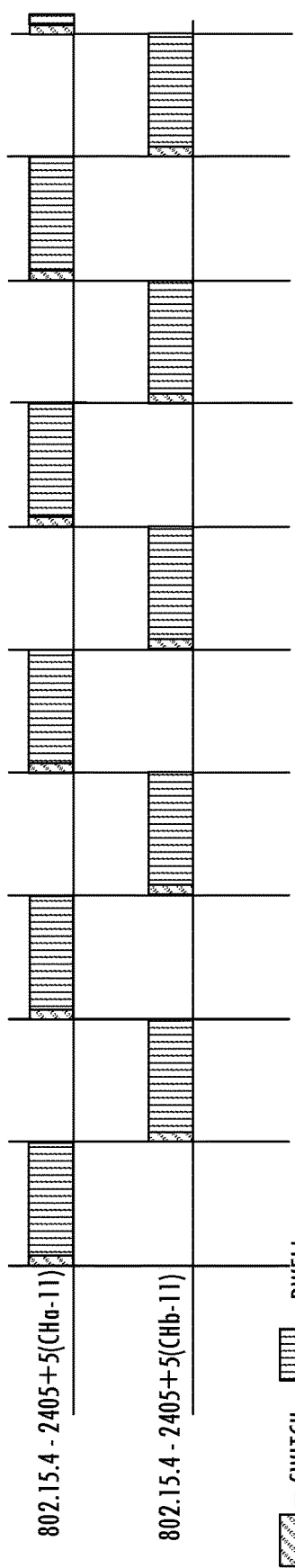
FIG. 20 illustrates an embodiment for channel switching for concurrent listening for two IEEE 802.15.4 channels.

FIG. 19A illustrates an embodiment for channel switching for concurrent listening for one IEEE 802.15.4 channel and three BLE ADV channels in which the IEEE 802.15.4 channel is given preference over the BLE ADV channels. Priority is given to the IEEE 802.15.4 channel by listening to the IEEE 802.15.4 channel more often than the BLE ADV channels. FIG. 19B illustrates the same preference with the save context step omitted. FIG. 20 illustrates an embodiment for channel switching for concurrent listening for two IEEE 802.15.4 channels shown as CHa and CHb. Note that the save context step is not shown in FIG. 20-22 but for embodiments that include a save context step, that operation occurs after the dwell time for each channel.

Figure 21:
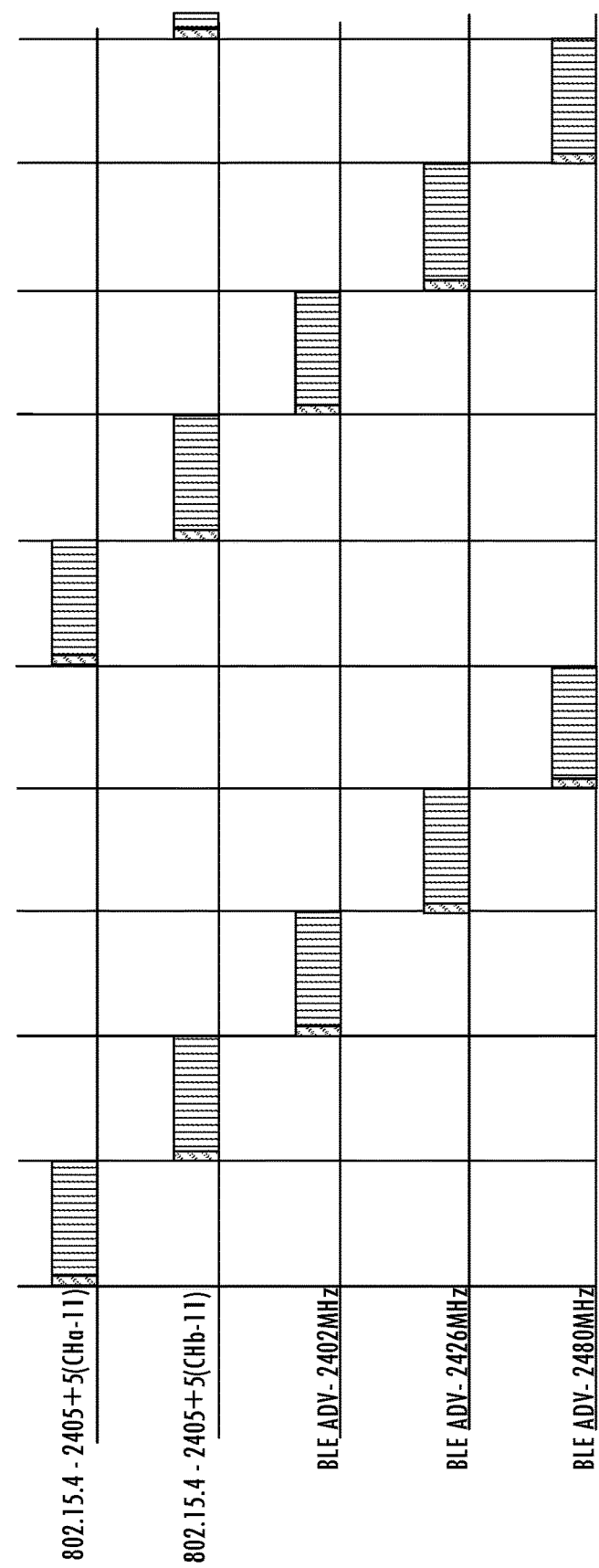
FIG. 21 illustrates an embodiment for channel switching for concurrent listening for two IEEE 802.15.4 channels and three BLE ADV channels.
Figure 22:
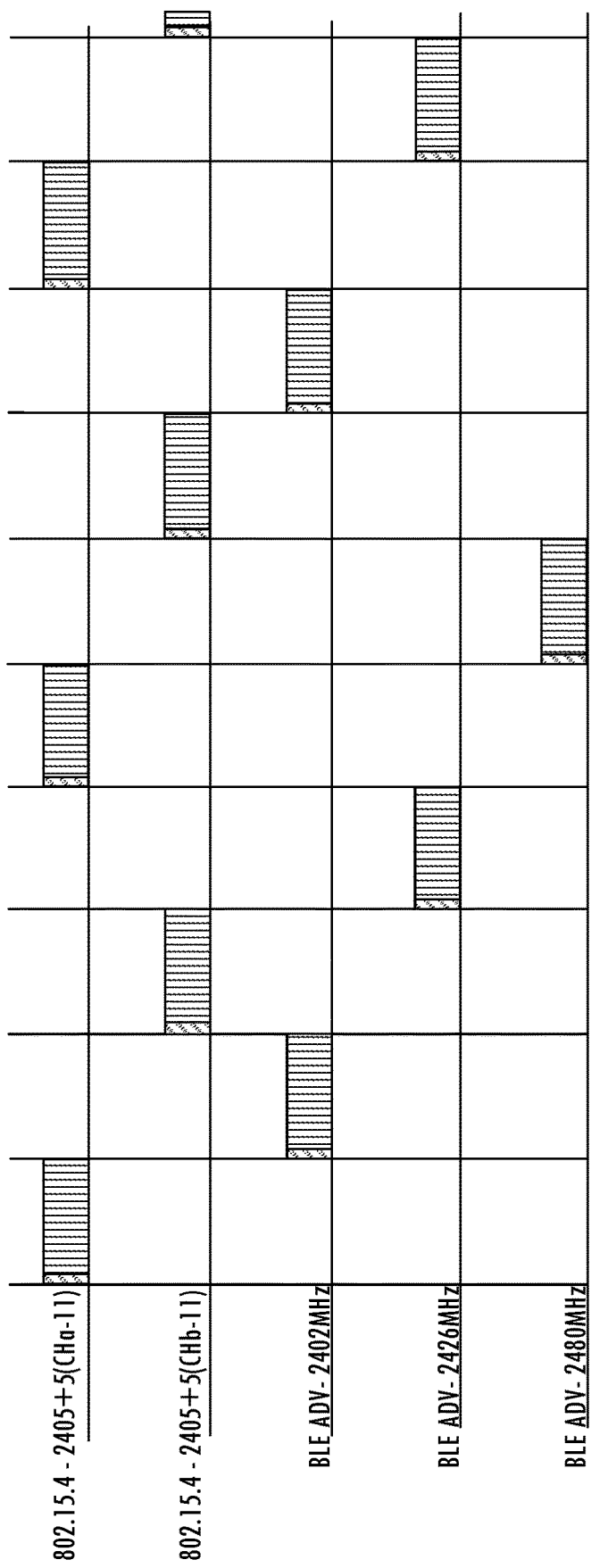
FIG. 22 illustrates another embodiment for channel switching for concurrent listening for two IEEE 802.15.4 channels and three BLE ADV channels.

FIG. 21 illustrates an embodiment for channel switching for concurrent listening for two IEEE 802.15.4 channels shown as CHa and CHb and three BLE ADV channels with priority being given equally to each channel. FIG. 22 illustrates an embodiment for concurrent listening for two 802.15.4 channels shown as CHa and CHb and three BLE ADV channels with priority being given to the two IEEE 802.15.4 channels. Priority is given by listening to the two IEEE 802.15.4 channels more often than the BLE ADV channels.

Note that as more channels are added to the concurrent listening sequence, degradation is expected due to the multi-PHY demodulator more frequently missing preamble detection and relying on signal identifiers, retries, and time-outs. While FIGS. 18A-22 show various preferential or equal weight listening sequences, many other weighting sequences can be used for listening. In addition, the weighting sequences can be both programmable and dynamic. Thus, the listening sequence can be initially programmed for a particular environment. In embodiments that sequence is dynamically changed based on detected traffic. For example, if more of one kind of traffic is detected, that traffic is given higher priority. If that traffic subsequently declines, the priority can move back towards a more equal weight or other appropriate weighting factor for the particular embodiment and environment. Thus, priority can change up or down based on detected traffic. In addition, CHK states (see FIGS. 15A and 16) can be reconfigured for various concurrent listening approaches, e.g., concurrent 802.15.4/802.15.4, concurrent 802.15.4/BLE, and concurrent 802.15.4/802.15.4/BLE.

Figure 23A:
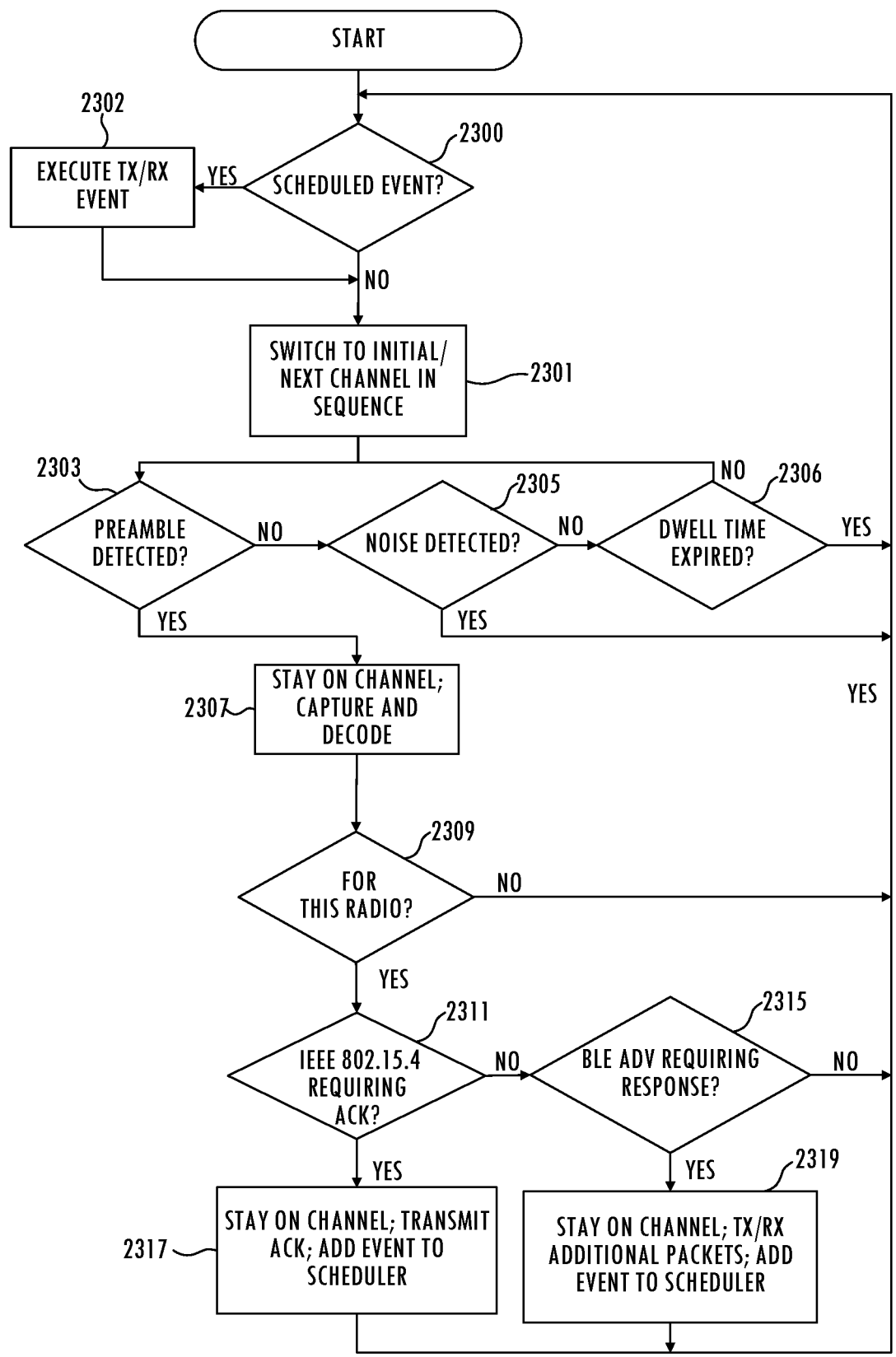
FIG. 23A is an embodiment of a flow diagram illustrating controller functionality associated with preamble detection.
Figure 23B:
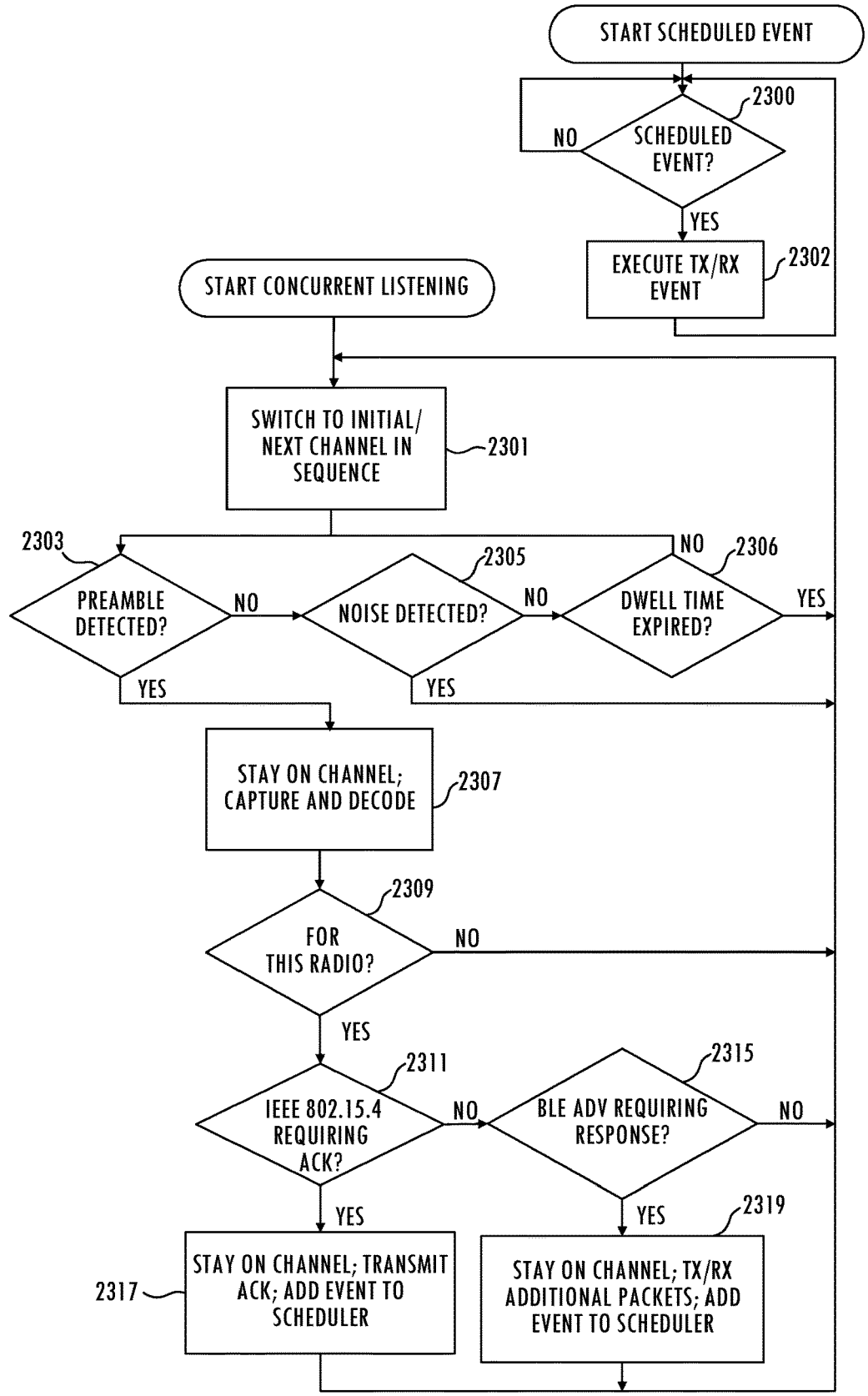
FIG. 23B is another embodiment of a flow diagram of illustrating controller functionality associated with preamble detection.
Figure 24:
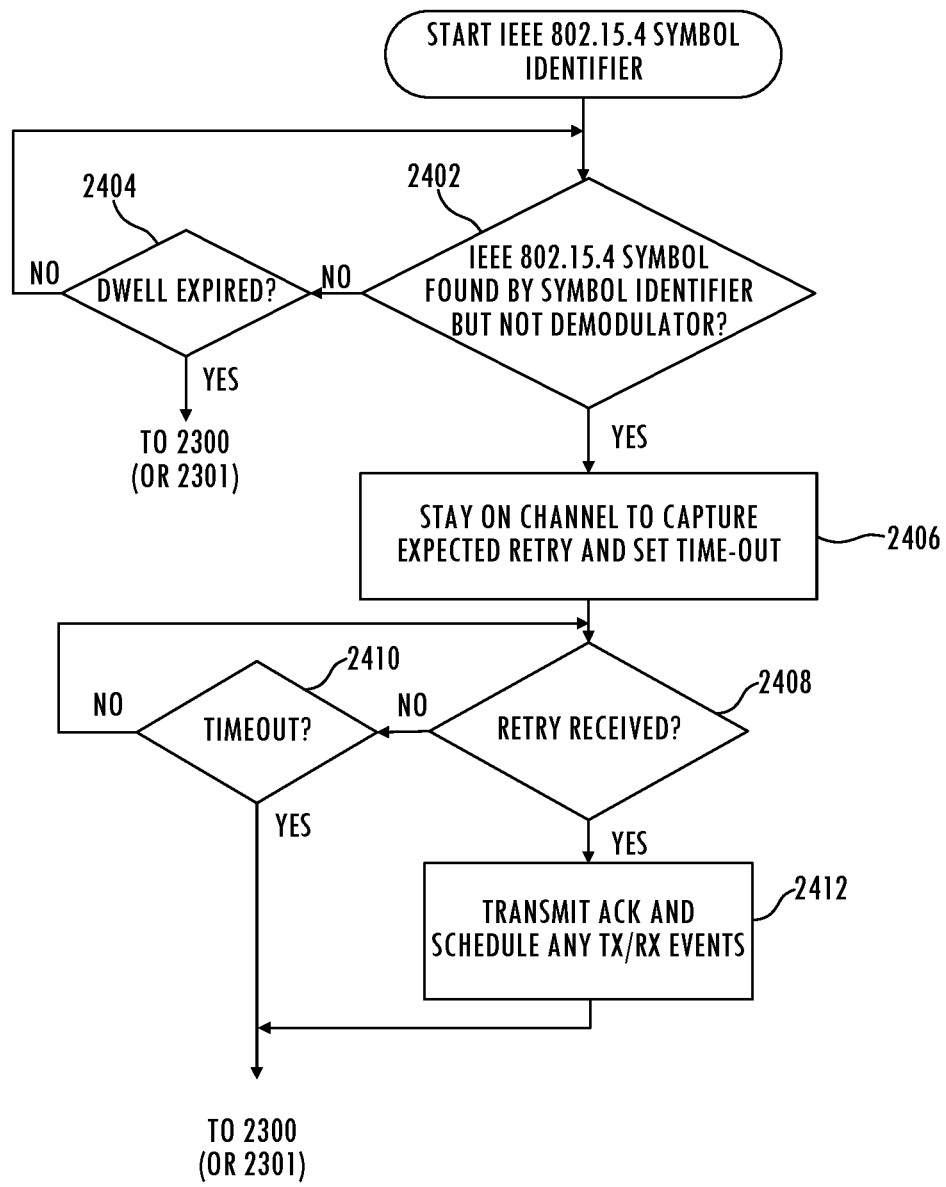
FIG. 24 is a flow diagram illustrating controller functionality associated with IEEE 802.15.4 symbol detection.
Figure 25:
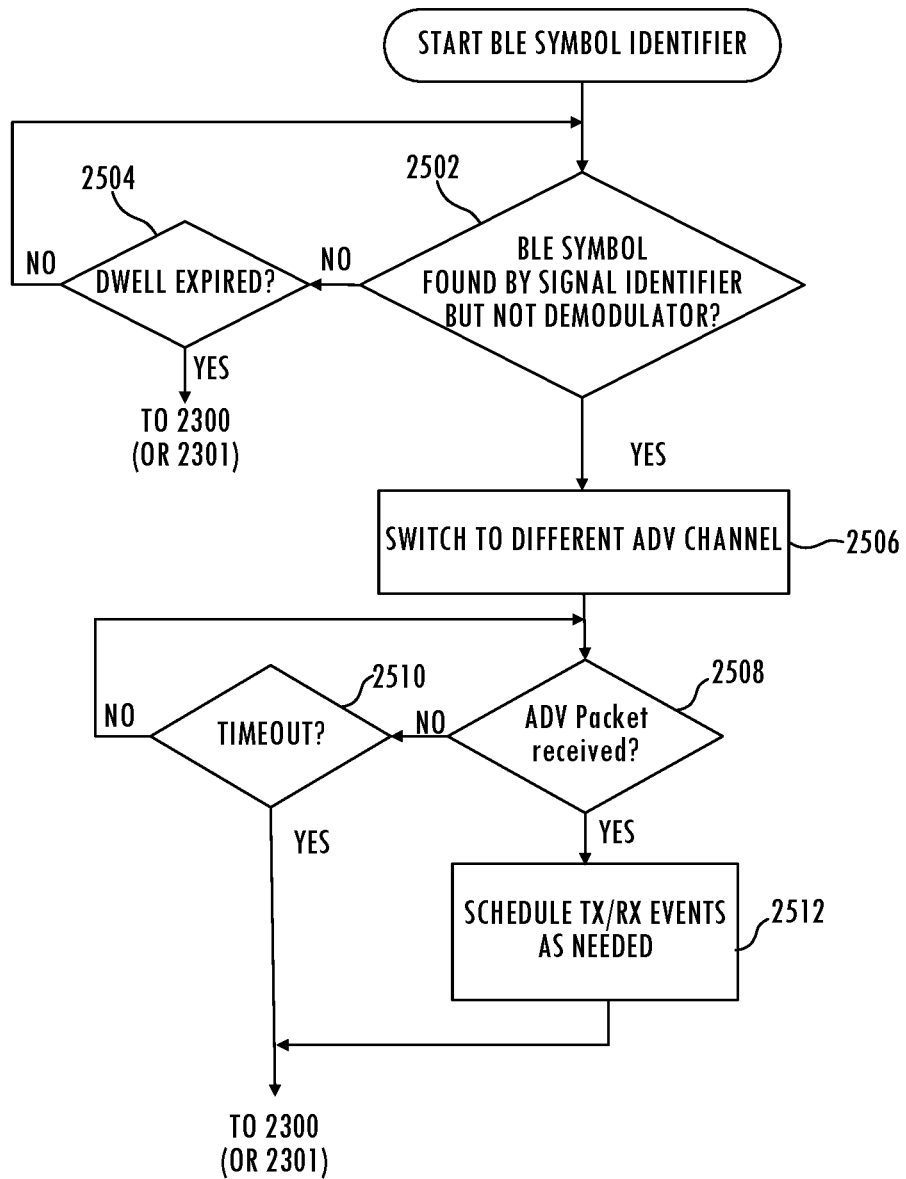
FIG. 25 is a flow diagram illustrating controller functionality associated with BLE symbol detection.

FIGS. 23-25 illustrate an exemplary control flow for an embodiment of a wireless communication device that includes the control structure shown in FIG. 17. As shown, e.g., in FIGS. 15A and 15B, many activities occur concurrently during background listening including preamble detection, symbol identification, and noise detection FIG. 23 illustrates the controller functionality associated with preamble detection although some of the functionality, e.g., switching to a next channel 2301, is common. As scheduled events (RX or TX) take precedence over background listening, in 2300, the controller checks to see if an event is scheduled. If so, the wireless communication device executes the TX/RX event in 2302 and then the controller switches to an initial/next channel selection in 2301. If not, the controller proceeds to 2301. In 2301 the controller switches to a next channel (or an initial channel) in the channel sequence such as the channel sequence shown in FIG. 22. The controller determines if a preamble has been detected by the correlators (see, e.g., the correlator bank in FIG. 4) in 2303. If not, the controller checks if noise has been detected in 2305 and if dwell time has expired in 2306. If either noise is detected or the dwell time has expired, the flow returns to 2300 for the controller to check for a scheduled event and then switch to the next RX channel in the sequence 2301. If the dwell time has not expired and no noise was detected, the controller continues to see if either the preamble is detected in 2303, the noise is detected in 2305, or dwell time expires in 2306. If the controller determines that the preamble has been detected in 2303 the controller stays on the current channel in 2307 to capture and decode the transmission associated with the preamble. The controller determines in 2309 if the transmission is for this wireless communication device or another wireless communication device. For example, the transmission may include an identifier identified with the wireless communication device and if the transmission is for the wireless communication device the controller then takes action based on whether the transmission is an IEEE 802.15.4 transmission or a BLE transmission. If the transmission is not for the wireless communication device the flow returns to 2300 for the controller to check for a scheduled event and then for the controller to switch to the next RX channel in the sequence. The controller checks in 2311 if the transmission is an IEEE 802.15.4 transmission requiring an acknowledge (ACK) or other action. If so, the wireless communication device stays on the current channel, transmits the ACK, and adds any events required to the scheduler before returning to 2300 to check for a scheduled event and then switches to the next RX channel in 2301. If the controller determines in 2315 that the transmission is a BLE ADV transmission requiring a response, the controller in 2319 causes the wireless communication device to stay on the current channel and transmit or receive additional packets as required. The controller adds any events required to the scheduler and returns to 2300 to check for any scheduled events and then switches to the next channel in the sequence in 2301.

While the control flow shows the scheduled events being checked in 2300 prior to switching to a next RX channel for concurrent listening, the check for the scheduled event may be an independent thread entered responsive to, e.g., a timer expiring or be interrupt driven to indicate the event needs to be executed. FIG. 23B illustrates such an embodiment. The process continually checks for a scheduled event in 2300 (or is interrupt driven) and executes that event in 2302 if an event is scheduled. Note that if the scheduled event check operates as an independent process as shown in the embodiment of FIG. 23B, the flow returns to 2301 from 2306, 2309, 2315, 2317, and 2319 to implement the next channel switch rather than check for a scheduled event.

As shown in FIGS. 15A and 15B, symbol identification runs concurrently with preamble detection and noise detection. FIG. 24 illustrates the control flow if an IEEE 802.15.4 symbol was found by the signal identifier but not the demodulator, which indicates that a preamble was not detected. That could be caused, e.g., by the receiver being tuned to that frequency for only a portion of preamble packet and that portion was not identified as a preamble. The more channels that are listened to, the more likely preamble packets will be missed or only partially received. Symbol detection in addition to preamble detection provides a mechanism to more efficiently listen for transmissions. The controller checks in 2402 if a symbol was detected and if not, the controller checks if the dwell time has expired in 2404. The controller waits for either a symbol to be detected or the dwell time to expire. If the dwell time has expired in 2404, the flow returns to check for scheduled events in 2300 (FIG. 23) and then switch channels in 2301 (or alternatively directly to 2301 if checking for scheduled events is an independent process). If a symbol is detected in 2402 but not a preamble, the controller causes the wireless communication device to stay on the current channel to capture an expected retry and sets a timeout in 2406. The timeout set in an embodiment is, e.g., 16 ms or less. The controller checks in 2408 if the retry was received and if the time out has expired in 2410. If the wireless communication device receives the retry in 2408, the wireless communication device transmits any necessary ACK and schedules any TX/RX events in 2412 and returns to 2300 (FIG. 23) or alternatively to 2301. If the timeout occurs before the retry is received, the flow returns to 2300 (FIG. 23) or alternatively to 2301.

FIG. 25 illustrates the control flow during concurrent listening if a BLE symbol was identified by the signal identifier but not the demodulator, which indicates that a symbol was detected but a preamble was not detected. That could be caused, e.g., by the receiver being tuned to that frequency for only a portion of preamble packet and that portion was not identified as a preamble. As stated earlier, the more channels that are listened to, the more likely preamble packets will be missed. The controller checks if a symbol was detected in 2502 and the controller checks if the dwell time has expired in 2504 and takes action according to which occurs first. If the dwell time has expired in 2504 before a symbol is detected, the flow returns to check for a scheduled event in 2300 (FIG. 23) and then switches to a next channel in 2301 or alternatively directly to 2301. If a BLE symbol is detected in 2502, the controller causes the wireless communication device to switch to a different advertising channel in 2506.

If the current advertising channel (ADV) is logical channel 37 (2402 MHz), the receiver switches to ADV channel 38 (2426 MHz) to match typical legacy switching by the transmitting device, although random ADV pattern transmitting devices may go to ADV channel 39 (2480 MHz) instead. If the current ADV channel is 38 (2426 MHz), the receiver switches to ADV channel 39 (2480 MHz) to match typical legacy switching although random ADV pattern transmitting devices may switch to ADV channel 37 (2402 MHz) instead. If the current ADV channel is 39 (2480 MHz), since channel 39 (2480 MHz) is the last channel, for legacy transmitting devices the ADV packet sequence would have been missed. However, random ADV pattern transmitting devices may switch to either ADV channel 37 (2402 MHz) or to channel 38 (2426 MHz). The controller then waits for the repeated ADV packet to be received in 2508 or the time-out in 2510. If the correct ADV channel was selected in 2506, the repeated ADV packet should arrive after the original ADV packet+150 µs for interframe spacing (IFS)+ an RX time-out. If an incorrect ADV channel was selected in 2506, the repeated ADV packet should arrive after the original ADV packet+150 µs IFS+ an RX time-out plus the second ADV packet+150 µs IFS+ an RX time-out. The time-out checked in 2510 should account for the larger time-out related to the possibility of switching to an incorrect ADV channel in 2506. If the ADV packet is received in 2508, the wireless communication device schedules any TX/RX events as needed and returns to 2300 (FIG. 23) to check on scheduled events and then switch to the next channel in 2301 or alternatively directly to 2301. If the time-out is reached in 2510, the wireless communication device returns to 2300 or alternatively to 2301. Note that while current ADV packets are BLE1M or BLELR, future ADV packets may include BLE2M.

While controller methodologies based on preamble and symbol identification, timeouts, dwell time, and the like have been described particularly for BLE and IEEE 802.15.4 protocols, the approaches described herein apply to concurrent listening for other transmission protocols and/or on multiple frequencies for only one transmission protocol.

Thus, a concurrent listening system has been described. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method for listening to a plurality of channels comprising:
   configuring a receiver to listen to a first channel of the plurality of channels;
   staying on the first channel and decoding one or more packets associated with a preamble responsive to the preamble being detected on the first channel;
   determining in symbol identifiers if respective symbols are detected on the first channel;
   staying on the first channel for a predetermined amount of time if a first symbol was detected by a first of the symbol indentifiers and the first symbol was transmitted with a first transmission protocol and a preamble associated with the first transmission protocol was not detected; and
   switching to listening to an advertising channel if a second symbol is detected by a second of the symbol identifiers and the second symbol was transmitted with a second transmission protocol and a second preamble associated with the second transmission protocol was not detected.

2. The method as recited in claim 1 further comprising switching the receiver to listening to a second channel of the plurality of channels responsive to noise being detected on the first channel.

3. The method as recited in claim 1 further comprising:
   dwelling on the first channel for a dwell time absent noise detection, absent preamble detection, and absent symbol identification; and
   responsive to the dwell time having expired switching to a second channel of the plurality of channels.

4. The method as recited in claim 1 further comprising:
   causing the receiver to listen to a second channel of the plurality of channels responsive to determining the one or more packets are for another wireless communication device.

5. The method as recited in claim 1 further comprising:
   staying on the first channel and transmitting an acknowledge responsive to the one or more packets requiring an acknowledge;
   staying on the first channel to receive or transmit one or more additional packets responsive to a response being required by the one or more packets; and
   adding a future schedulable event to a scheduler responsive to the one or more packets requiring the future schedulable event.

6. The method as recited in claim 1 further comprising:
   causing the receiver to switch to a second channel responsive to the predetermined amount of time expiring before a retry packet is received.

7. The method as recited in claim 1 further comprising:
   waiting for receipt of a repeated advertising packet on the advertising channel or a time out, whichever occurs first; and
   causing the receiver to switch to listening to a second channel of the plurality of channels responsive to the time out occurring first.

8. The method as recited in claim 1 further comprising listening to the plurality of channels in a predetermined order.

9. The method as recited in claim 1 further comprising giving listening priority to the first transmission protocol or the second transmission protocol.

10. The method as recited in claim 1 further comprising changing listening priority given to the first transmission protocol, the second transmission protocol, or both the first transmission protocol and the second transmission protocol.

11. A wireless communication device comprising:
    a controller responsive to a preamble being detected on a first channel of a plurality of channels to cause a receiver of the wireless communication device to stay on the first channel and decode one or more packets associated with the preamble;
    symbol identifiers to detect respective symbols on the first channel;
    wherein if a first symbol is detected by a first of the symbol identifiers, the controller is responsive to the first symbol having been transmitted with a first transmission protocol and a first preamble associated with the first transmission protocol not being detected to cause the receiver to stay on the first channel for a predetermined amount of time waiting for a retry packet; and
    wherein if a second symbol is detected by a second of the symbol identifiers, the controller causes the receiver to switch to listening to an advertising channel of a second transmission protocol responsive to the second symbol having been transmitted with the second transmission protocol and a preamble associated with the second transmission protocol not being detected.

12. The wireless communication device as recited in claim 11 further comprising:
    a noise detector; and wherein the controller is responsive to noise being detected on the first channel to cause the receiver to switch to listening to a second channel of the plurality of channels.

13. The wireless communication device as recited in claim 11 wherein the controller causes the receiver to switch to a second channel responsive to the predetermined amount of time expiring before the retry packet is received.

14. The wireless communication device as recited in claim 11 wherein the controller causes the receiver to dwell on the first channel for a dwell time absent noise detection, absent preamble detection, and absent symbol identification, and responsive to the dwell time having expired causes the receiver to switch to a second channel of the plurality of channels.

15. The wireless communication device as recited in claim 11 wherein the controller causes the receiver to switch to listening to a second channel of the plurality of channels responsive to the one or more packets being for another wireless communication device.

16. The wireless communication device as recited in claim 11,
wherein the wireless communication device stays on the first channel and transmits an acknowledge packet responsive to the one or more packets requiring an acknowledge;
wherein the wireless communication device stays on the first channel to receive or transmit one or more additional packets responsive to a response being required by the one or more packets; and
wherein the wireless communication device adds a future schedulable event to a scheduler responsive to the one or more packets requiring the future schedulable event.

17. The wireless communication device as recited in claim 11,
wherein the advertising channel is one of the plurality of channels;
wherein the first channel is another advertising channel of the second transmission protocol;
wherein the wireless communication device waits for receipt of a repeated advertising packet on the advertising channel or a time out, whichever occurs first; and
wherein the controller causes the receiver to listen to another channel of the plurality of channels responsive to the time out occurring, the other channel being different than the first channel and the advertising channel.

18. The wireless communication device as recited in claim 11 wherein the receiver listens to the plurality of channels in a predetermined order.

19. The wireless communication device as recited in claim 11 wherein the wireless communication device gives listening priority to the first transmission protocol or the second transmission protocol.

20. The wireless communication device as recited in claim 11 wherein the wireless communication device gives equal listening priority to the first transmission protocol and the second transmission protocol.

21. A wireless communication device comprising:
a demodulator configured to demodulate data from a plurality of transmission protocols;
one or more symbol identifier circuits coupled to the demodulator;
a controller responsive to a preamble being detected by the demodulator on a first channel of a plurality of channels while a receiver of the wireless communication device is tuned to the first channel to cause the receiver to stay on the first channel and cause the receiver to decode one or more packets associated with the preamble;
wherein the controller is responsive to a first symbol of a first transmission protocol being detected by one of the one or more symbol identifier circuits and a first preamble of the first transmission protocol not being detected, to cause the receiver to stay on the first channel for a predetermined amount of time; and
wherein the controller is responsive to a second symbol of a second transmission protocol being detected by one of the one or more symbol identifier circuits and a second preamble of the second transmission protocol not being detected, to cause the receiver to switch to listening to an advertising channel of the second transmission protocol.

* * * * *

UNITED STATES PATENT AND TRADEMARK OFFICE
CERTIFICATE OF CORRECTION

PATENT NO. : 12,219,599 B2
APPLICATION NO. : 17/743042
DATED : February 4, 2025
INVENTOR(S) : Terry L. Dickey et al.

Page 1 of 1

It is certified that error appears in the above-identified patent and that said Letters Patent is hereby corrected as shown below:

In the Specification

In Column 12, Line 39, please replace "shared channel shared" with --channel shared--;
In Column 17, Line 9, please replace "noise detection" with --noise detection.--.

Signed and Sealed this
Twenty-ninth Day of April, 2025

Coke Morgan Stewart
*Acting Director of the United States Patent and Trademark Office*